(12) United States Patent
Hayashi

(10) Patent No.: US 10,983,739 B2
(45) Date of Patent: Apr. 20, 2021

(54) INFORMATION PROCESSING APPARATUS, INFORMATION PROCESSING SYSTEM, AND INFORMATION PROCESSING METHOD CONFIGURED TO CONSTRUCT A SERVER IN THE MOBILE TERMINAL THROUGH WHICH AN OUTPUT DEVICE COMMUNICATES WITH THE MOBILE TERMINAL USING A COMMUNICATION INFORMATION

(71) Applicant: Yasuhiro Hayashi, Kanagawa (JP)

(72) Inventor: Yasuhiro Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/771,522

(22) PCT Filed: Nov. 22, 2016

(86) PCT No.: PCT/JP2016/084650
§ 371 (c)(1),
(2) Date: Apr. 27, 2018

(87) PCT Pub. No.: WO2017/090626
PCT Pub. Date: Jun. 1, 2017

(65) Prior Publication Data
US 2018/0349076 A1    Dec. 6, 2018

(30) Foreign Application Priority Data

Nov. 26, 2015  (JP) .................................. 2015-230917
Oct. 21, 2016  (JP) ............................. JP2016-206940

(51) Int. Cl.
*H04N 21/21*       (2011.01)
*G06F 3/12*        (2006.01)
(Continued)

(52) U.S. Cl.
CPC ............ *G06F 3/1236* (2013.01); *B41J 29/38* (2013.01); *G06F 3/1204* (2013.01);
(Continued)

(58) Field of Classification Search
USPC ................................ 358/1.1–3.29, 1.11–1.18
See application file for complete search history.

(56) References Cited

U.S. PATENT DOCUMENTS 8,335,489 B2    12/2012  Hamada
2011/0177780 A1  7/2011  Sato et al.
(Continued)

FOREIGN PATENT DOCUMENTS

JP       5121212       1/2013
JP       2016-027454   2/2016

OTHER PUBLICATIONS

International Search Report dated Jan. 31, 2017 in PCT/JP2016/084650 filed on Nov. 22, 2016.
(Continued)

*Primary Examiner* — Marcellus J Augustin
(74) *Attorney, Agent, or Firm* — IPUSA, PLLC

(57) ABSTRACT

An information processing apparatus coupled to a device via at least one of a plurality of networks includes a memory having computer readable instructions and at least one processor configured to execute the computer readable instructions to transmit to the device first communication information for performing communication between the device and the information processing apparatus, when a process is requested from the device; determine whether the communication is possible via a first network to which the device is coupled according to whether the communication is performed using the first communication information; connect to a second network using second communication information for connecting to the second network, when the (Continued)

communication is determined impossible via the first network; and determine whether the communication is possible via the second network according to whether the communication is performed using the first communication information via the second network.

13 Claims, 19 Drawing Sheets

(51) Int. Cl.
    *H04N 1/00*         (2006.01)
    *H04N 1/333*       (2006.01)
    *H04N 1/327*       (2006.01)
    *B41J 29/38*       (2006.01)

(52) U.S. Cl.
    CPC ......... *G06F 3/1292* (2013.01); *H04N 1/0048* (2013.01); *H04N 1/00307* (2013.01); *H04N 1/00315* (2013.01); *H04N 1/00411* (2013.01); *H04N 1/00413* (2013.01); *H04N 1/00472* (2013.01); *H04N 1/00482* (2013.01); *H04N 1/00973* (2013.01); *H04N 1/32767* (2013.01); *H04N 1/32771* (2013.01); *H04N 1/33323* (2013.01); *H04N 1/33361* (2013.01); *H04N 2201/0036* (2013.01); *H04N 2201/0039* (2013.01); *H04N 2201/0041* (2013.01); *H04N 2201/0055* (2013.01); *H04N 2201/0075* (2013.01); *H04N 2201/0094* (2013.01); *H04N 2201/0096* (2013.01)

(56) References Cited

U.S. PATENT DOCUMENTS

| | | | |
|---|---|---|---|
| 2012/0244814 A1* | 9/2012 | Okayasu | H04M 1/6066 |
| | | | 455/41.3 |
| 2012/0278452 A1 | 11/2012 | Schmitz et al. | |
| 2012/0295540 A1* | 11/2012 | Hong | H04M 1/72561 |
| | | | 455/41.1 |
| 2012/0296963 A1* | 11/2012 | Lu | H04W 84/00 |
| | | | 709/203 |
| 2014/0240772 A1 | 8/2014 | Suzuki | |
| 2015/0116753 A1 | 4/2015 | Sato | |
| 2015/0120555 A1* | 4/2015 | Jung | G06Q 20/384 |
| | | | 705/44 |
| 2015/0189023 A1* | 7/2015 | Kubota | H04W 4/80 |
| | | | 455/7 |
| 2015/0312361 A1* | 10/2015 | Seo | H04W 48/00 |
| | | | 370/329 |
| 2016/0174191 A1* | 6/2016 | Singh | H04W 60/005 |
| | | | 370/329 |
| 2016/0261769 A1* | 9/2016 | Yamada | H04W 76/14 |
| 2017/0099570 A1 | 4/2017 | Yamada | |
| 2017/0134609 A1* | 5/2017 | Park | H04N 1/00278 |

OTHER PUBLICATIONS

Extended European Search Report for 16868569.1 dated Aug. 24, 2018.

* cited by examiner

[Fig. 1A]
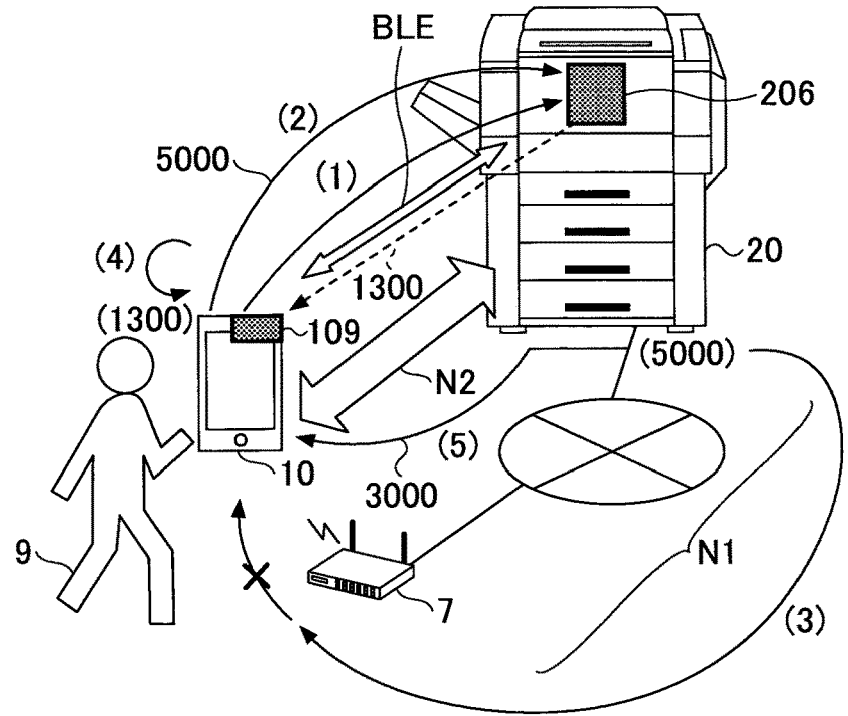
[Fig. 1B]
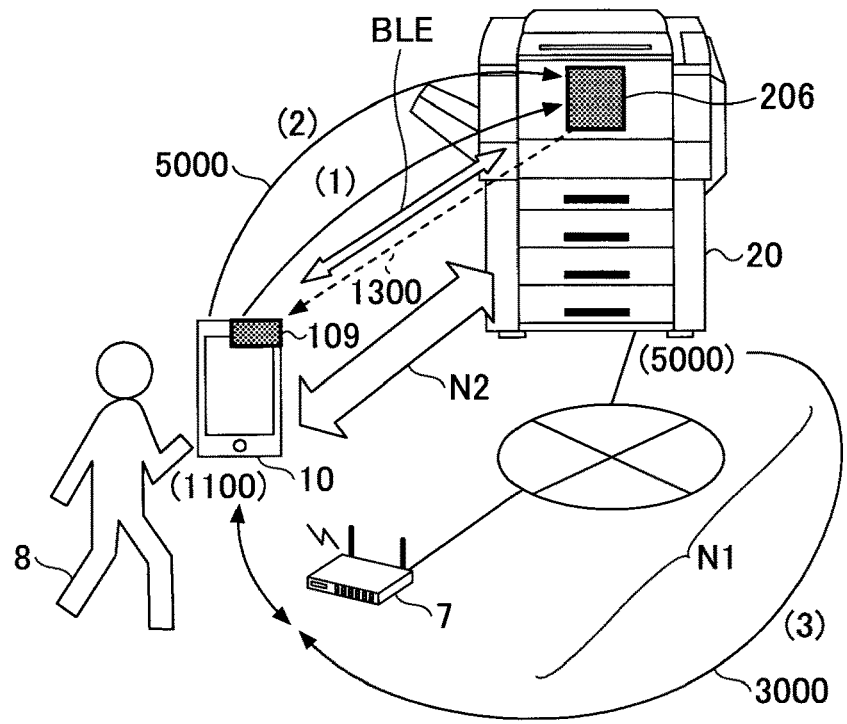

[Fig. 2]
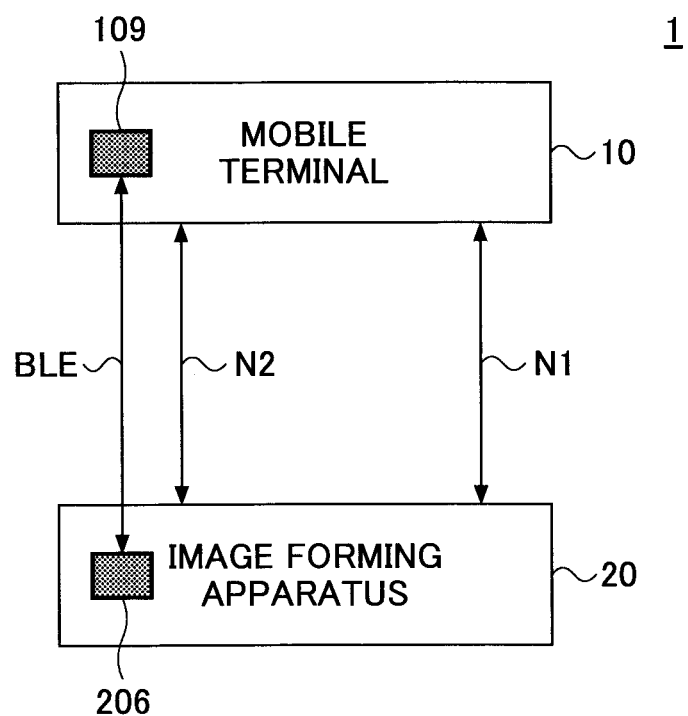

[Fig. 3]
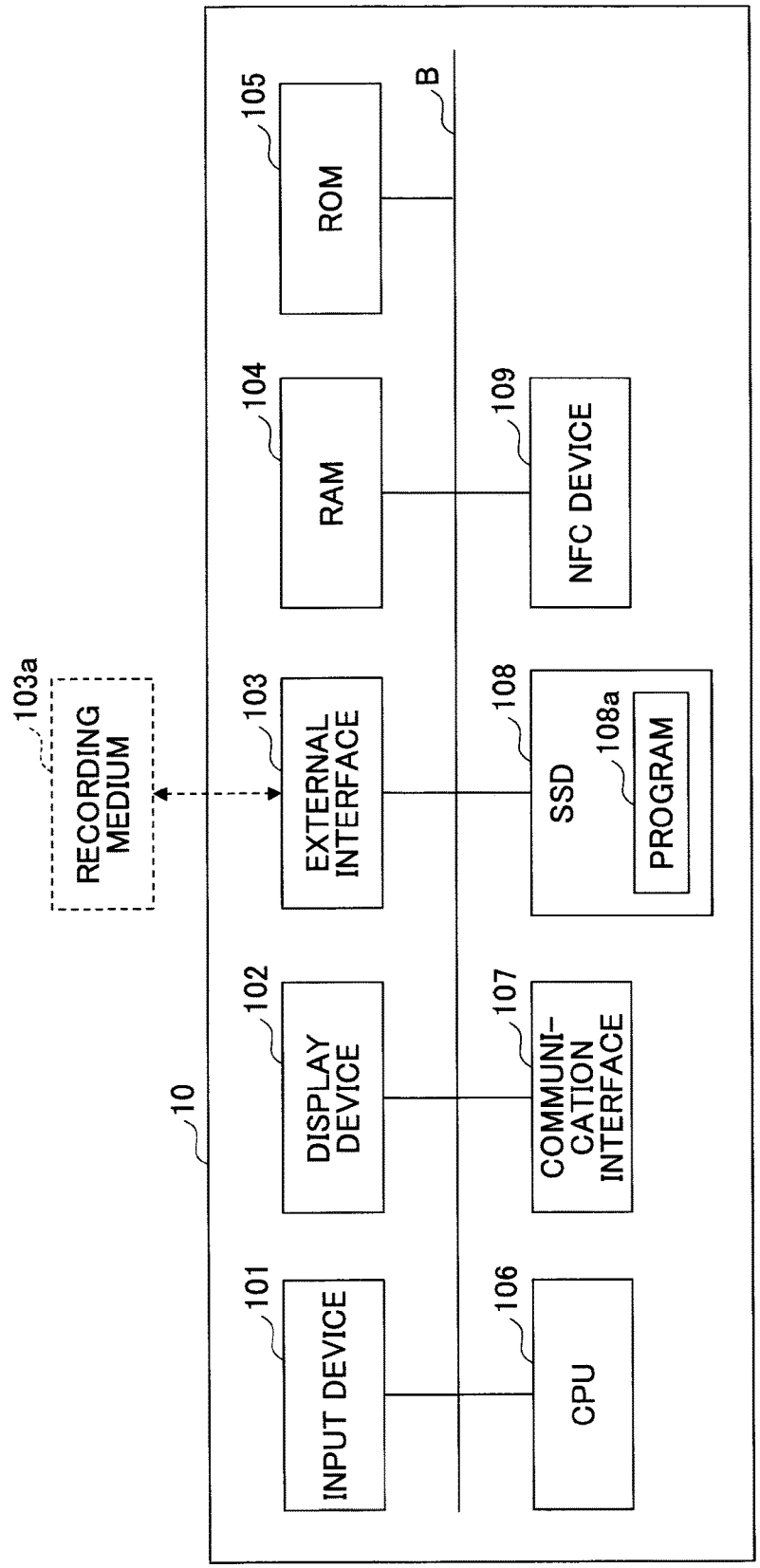

[Fig. 4]
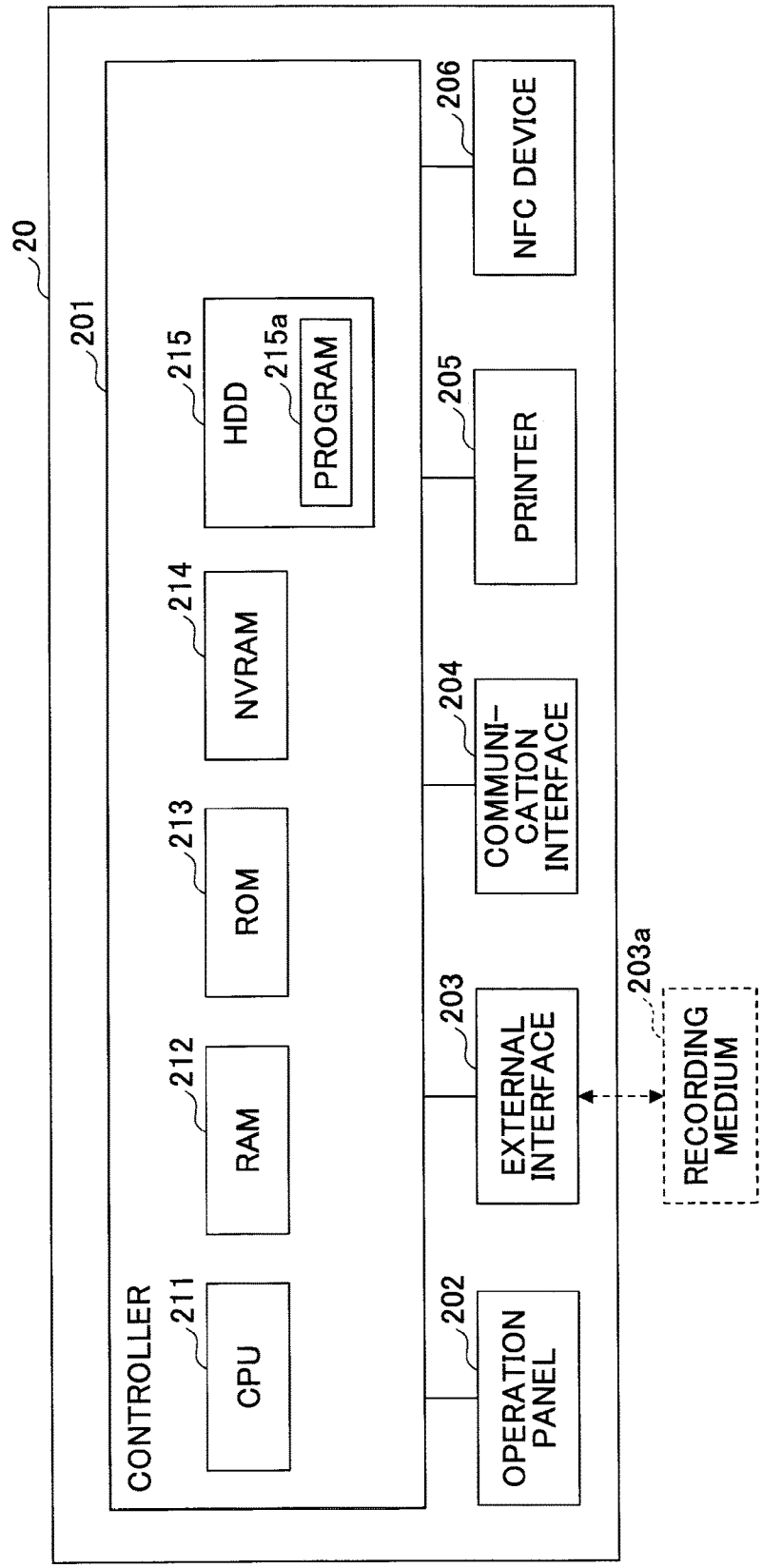

[Fig. 5]
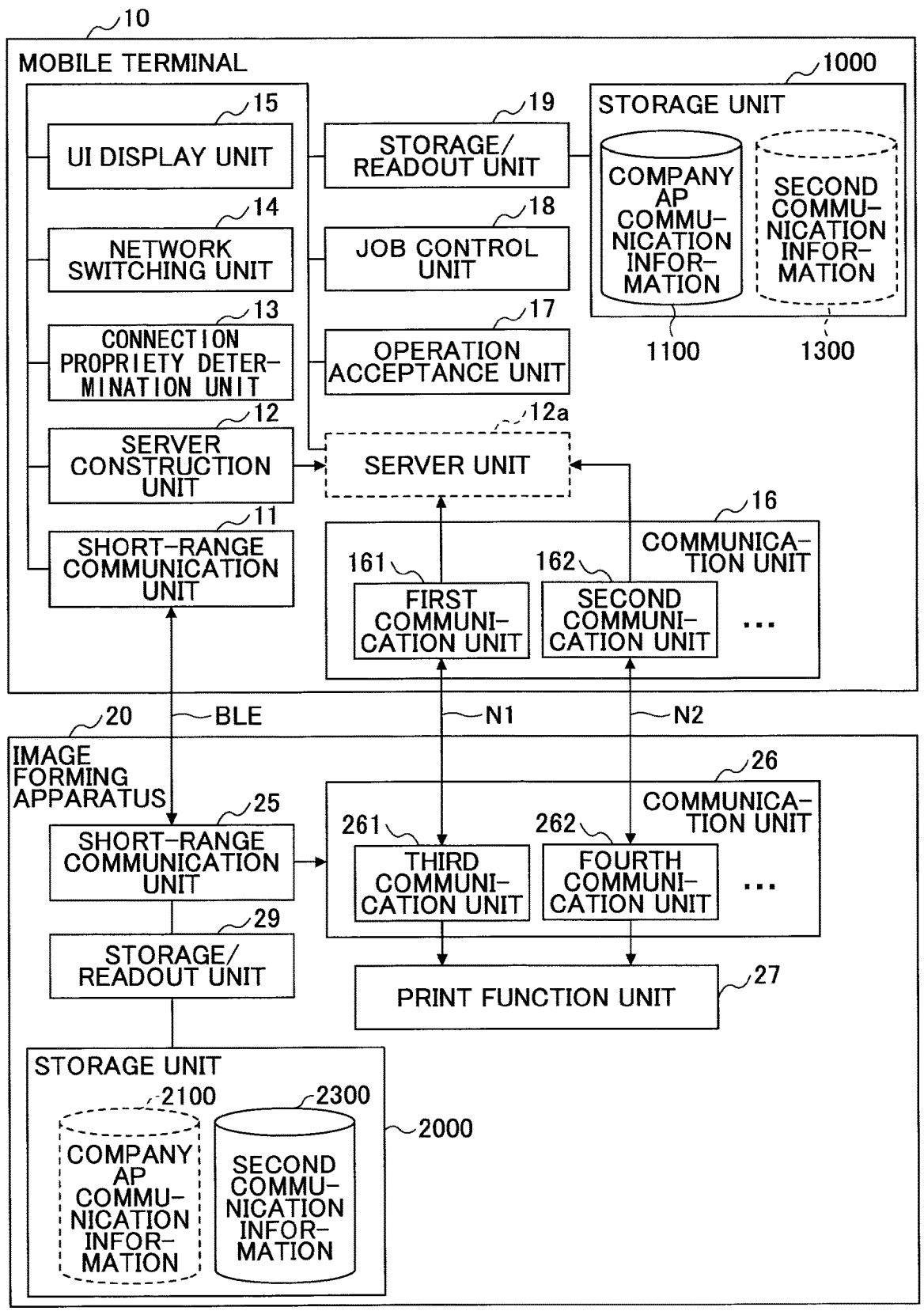

[Fig. 6]
URL INFORMATION
<IP ADDRESS OF MOBILE TERMINAL><PORT NUMBER><ONE-TIME PASSWORD>
ex. <10.60.100.101><50000><ABCDEFGH>
5000
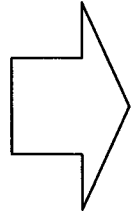
http://IP ADDRESS OF MOBILE TERMINAL: PORT NUMBER/ONE-TIME PASSWORD
ex. http://10.60.100.101:50000/ABCDEFGH

[Fig. 7]
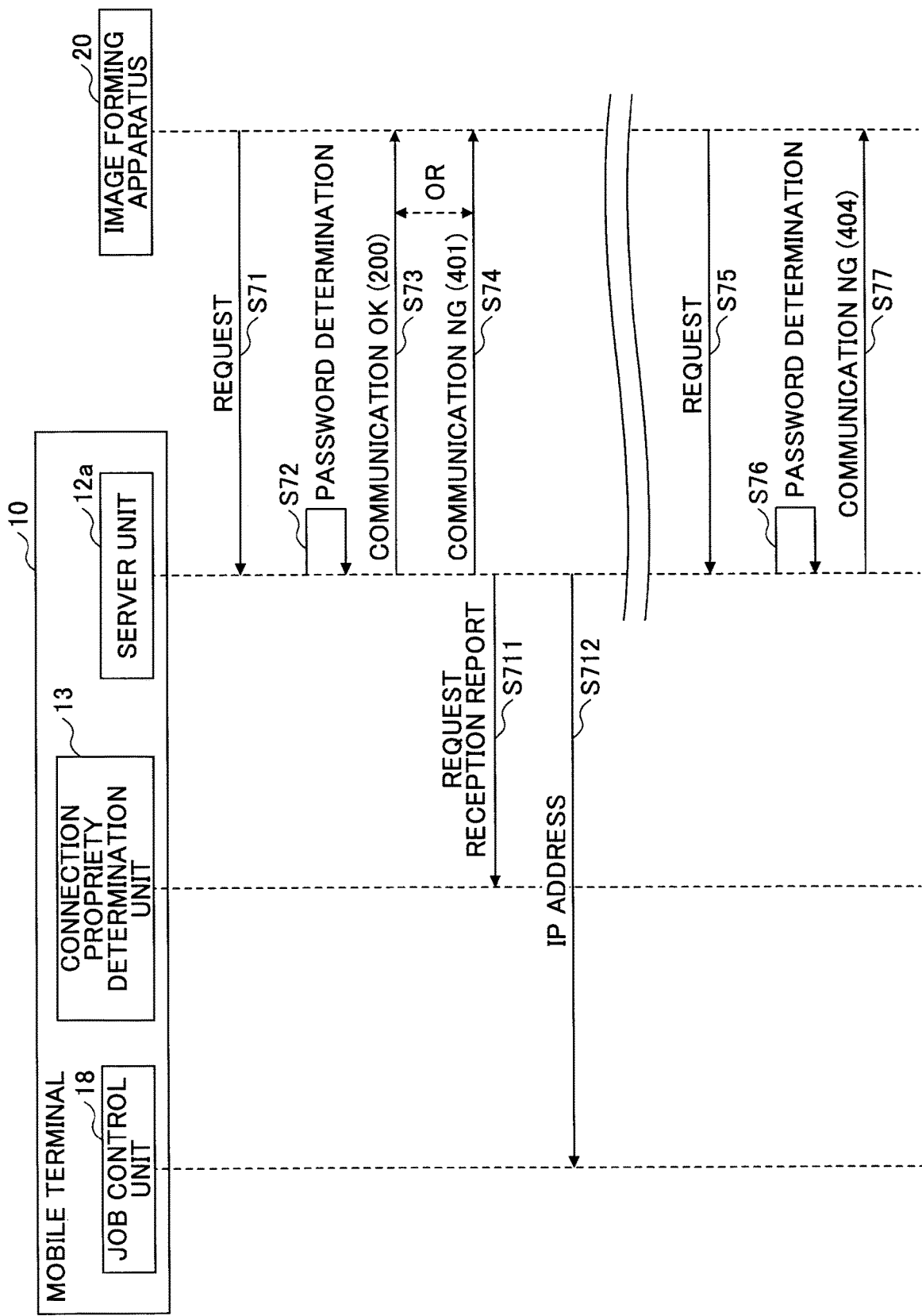

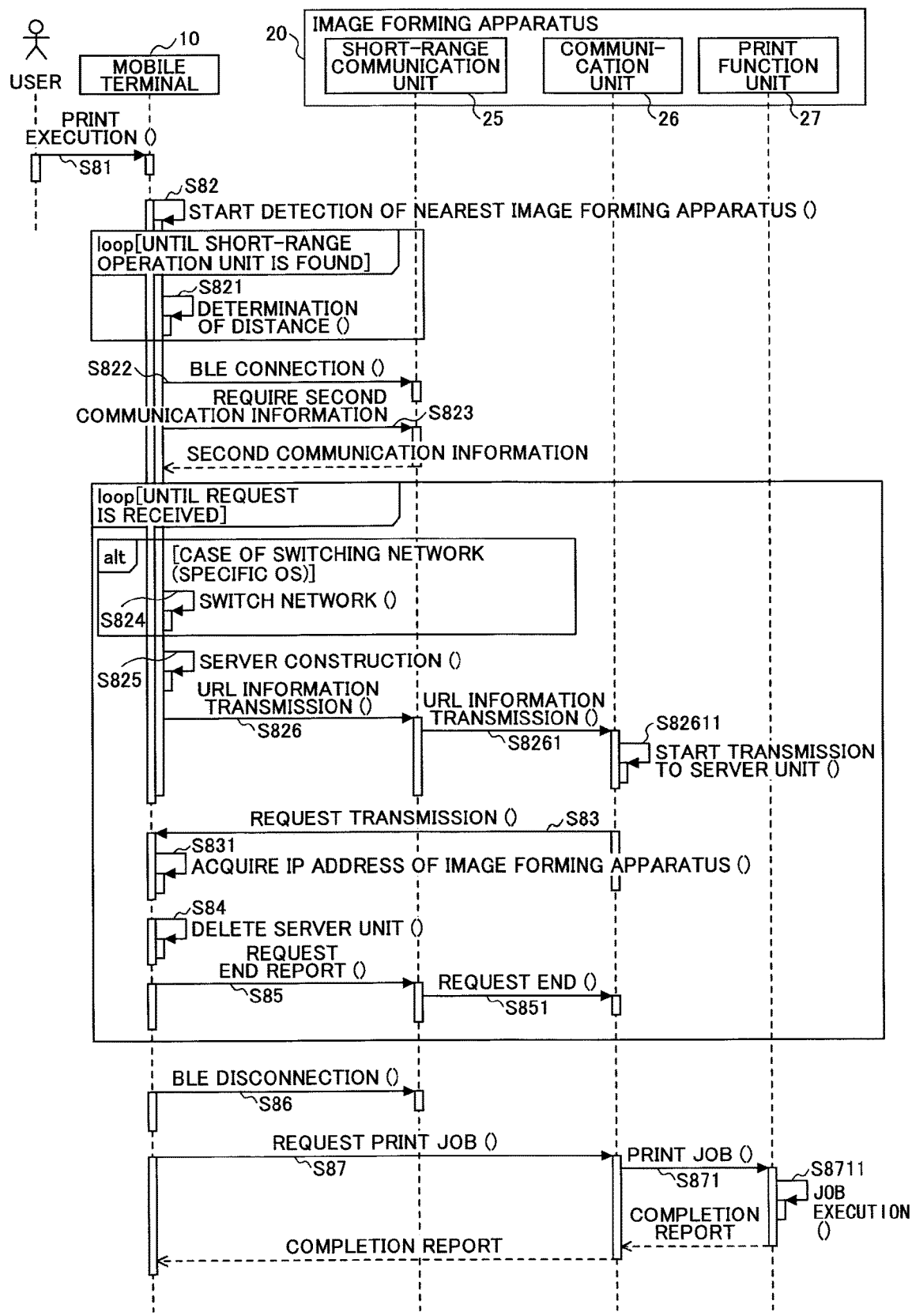
[Fig. 8]

[Fig. 9A]
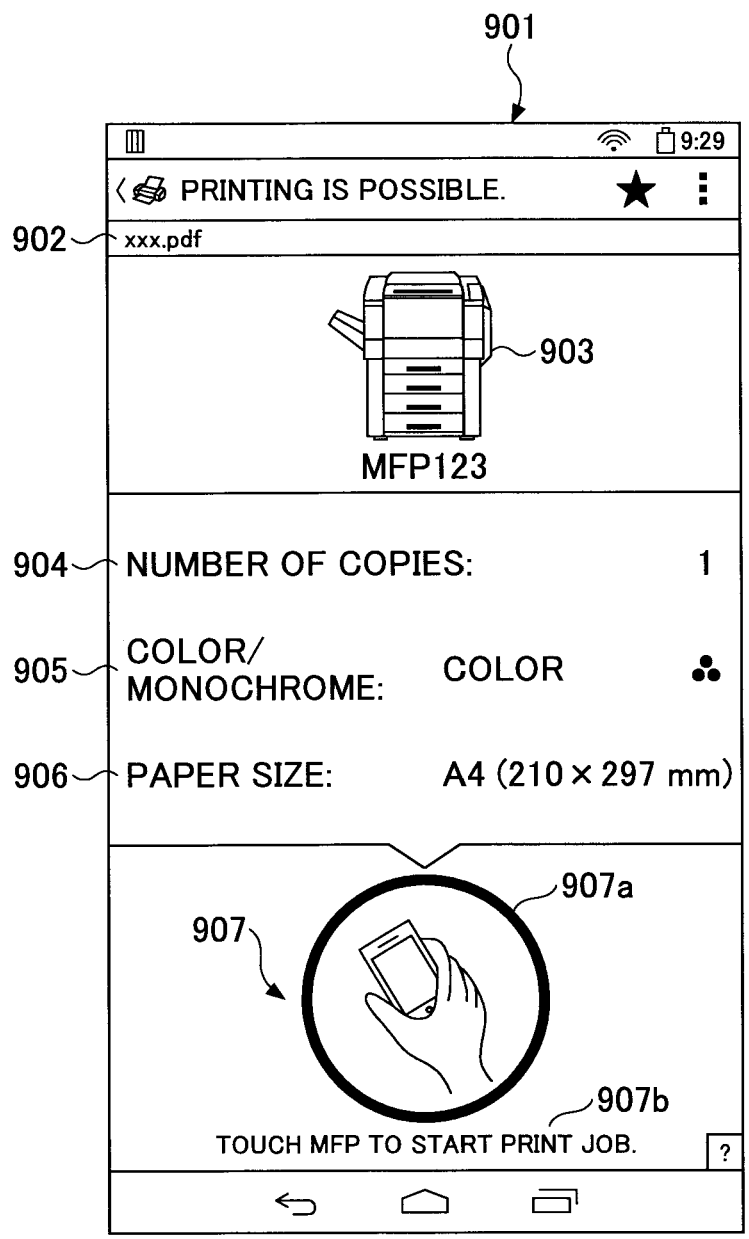

[Fig. 9B]
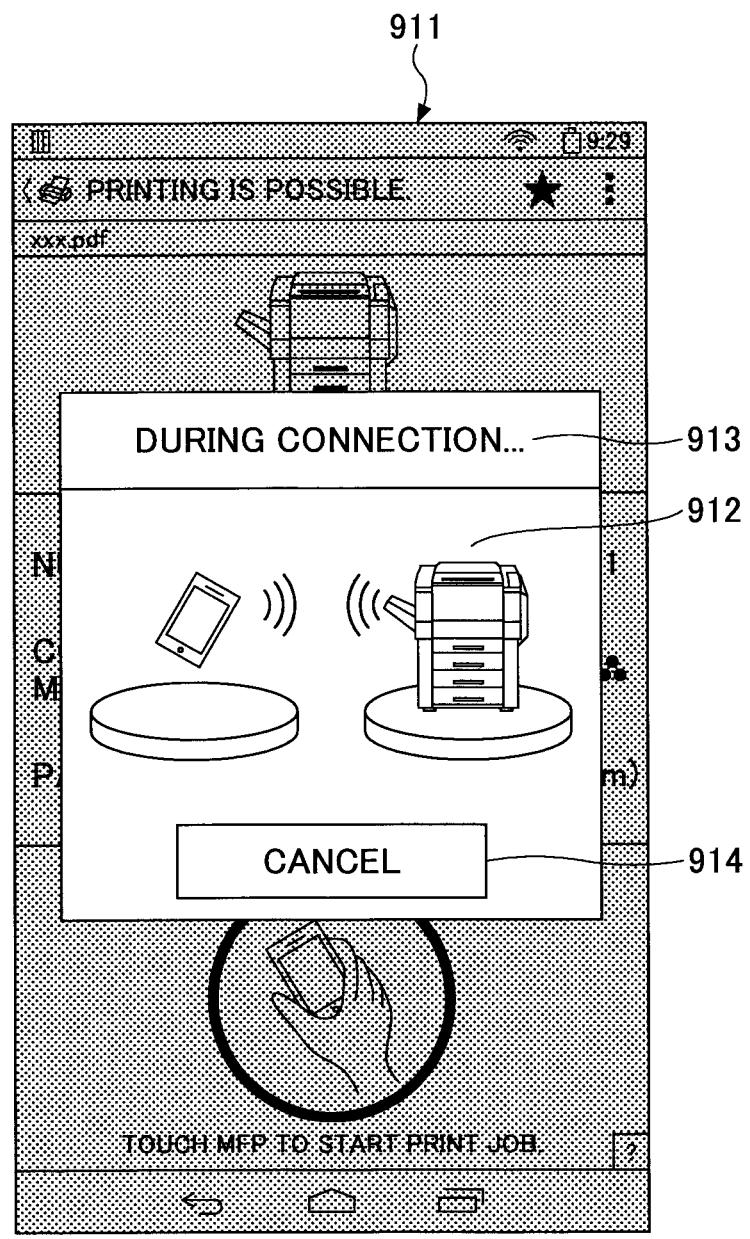

[Fig. 10A]
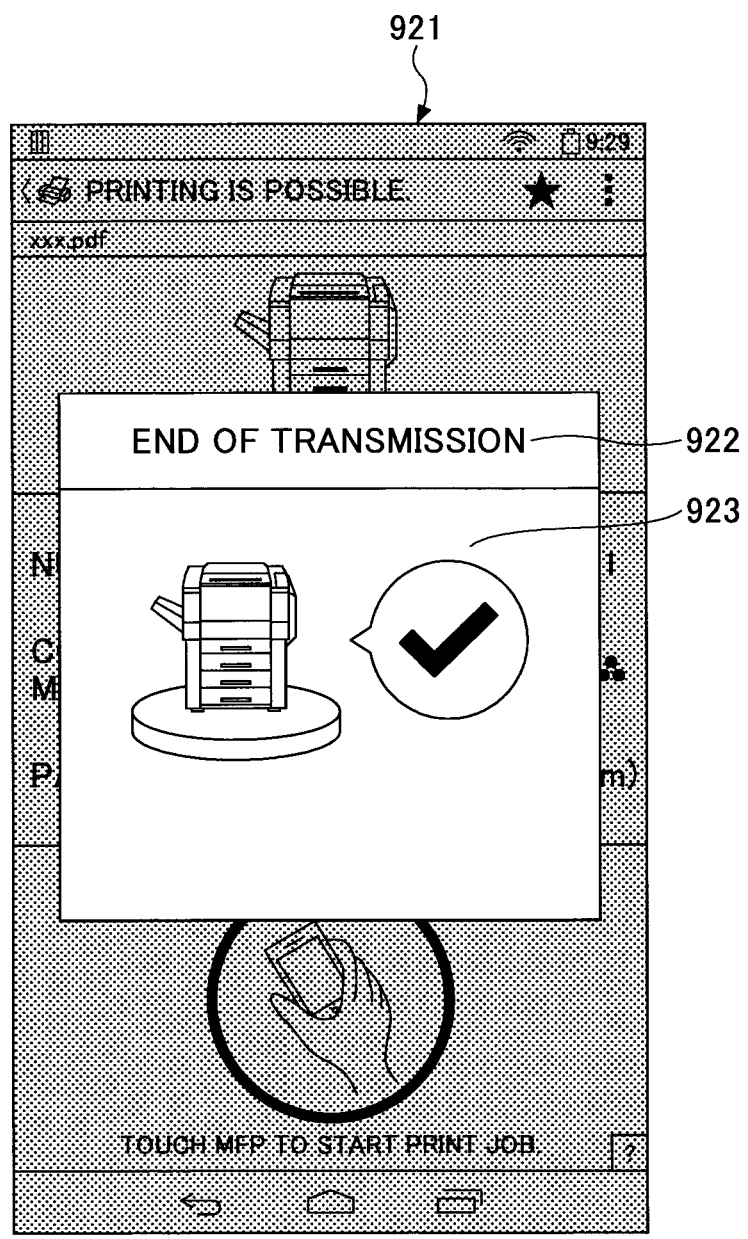

[Fig. 10B]
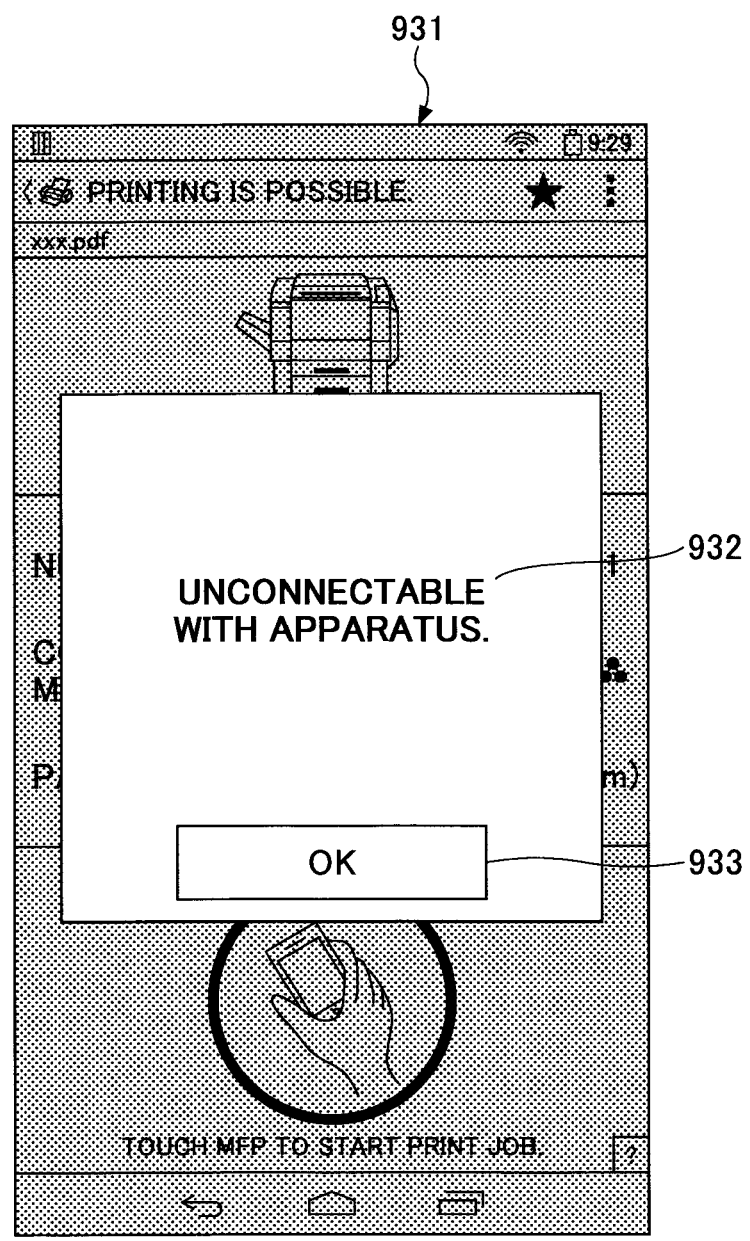

[Fig. 11]
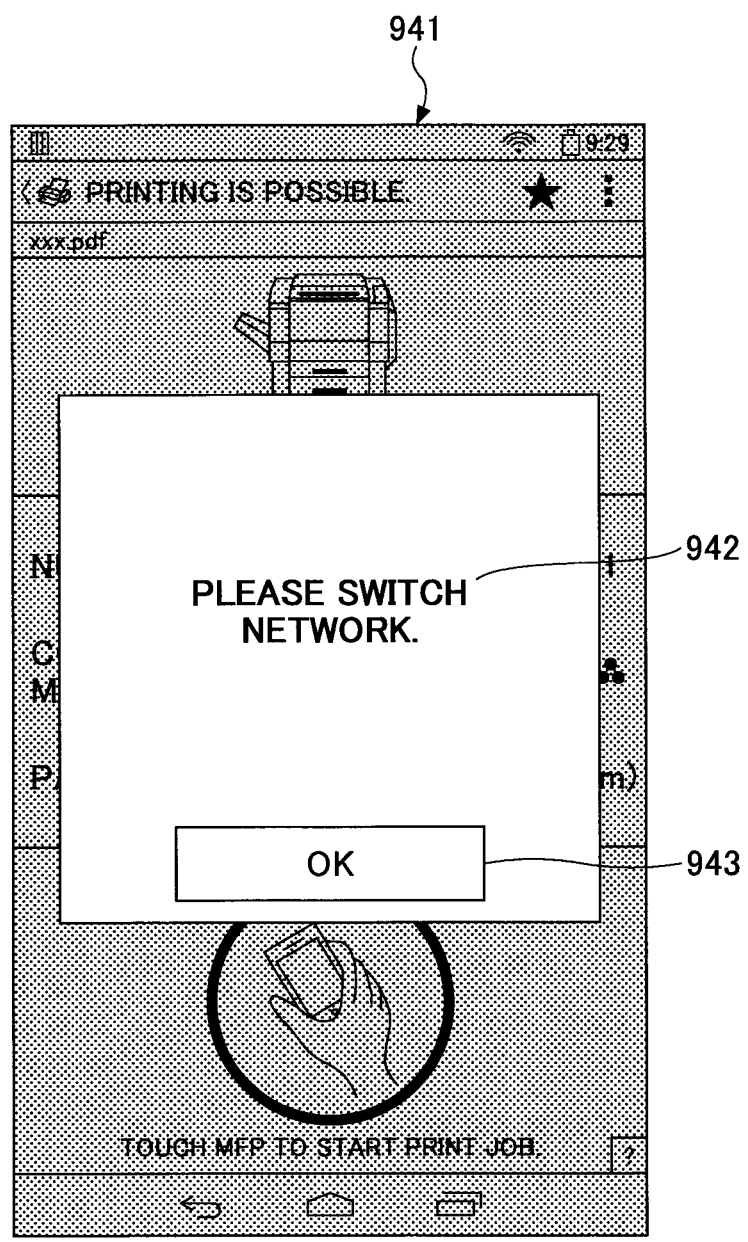

[Fig. 12]
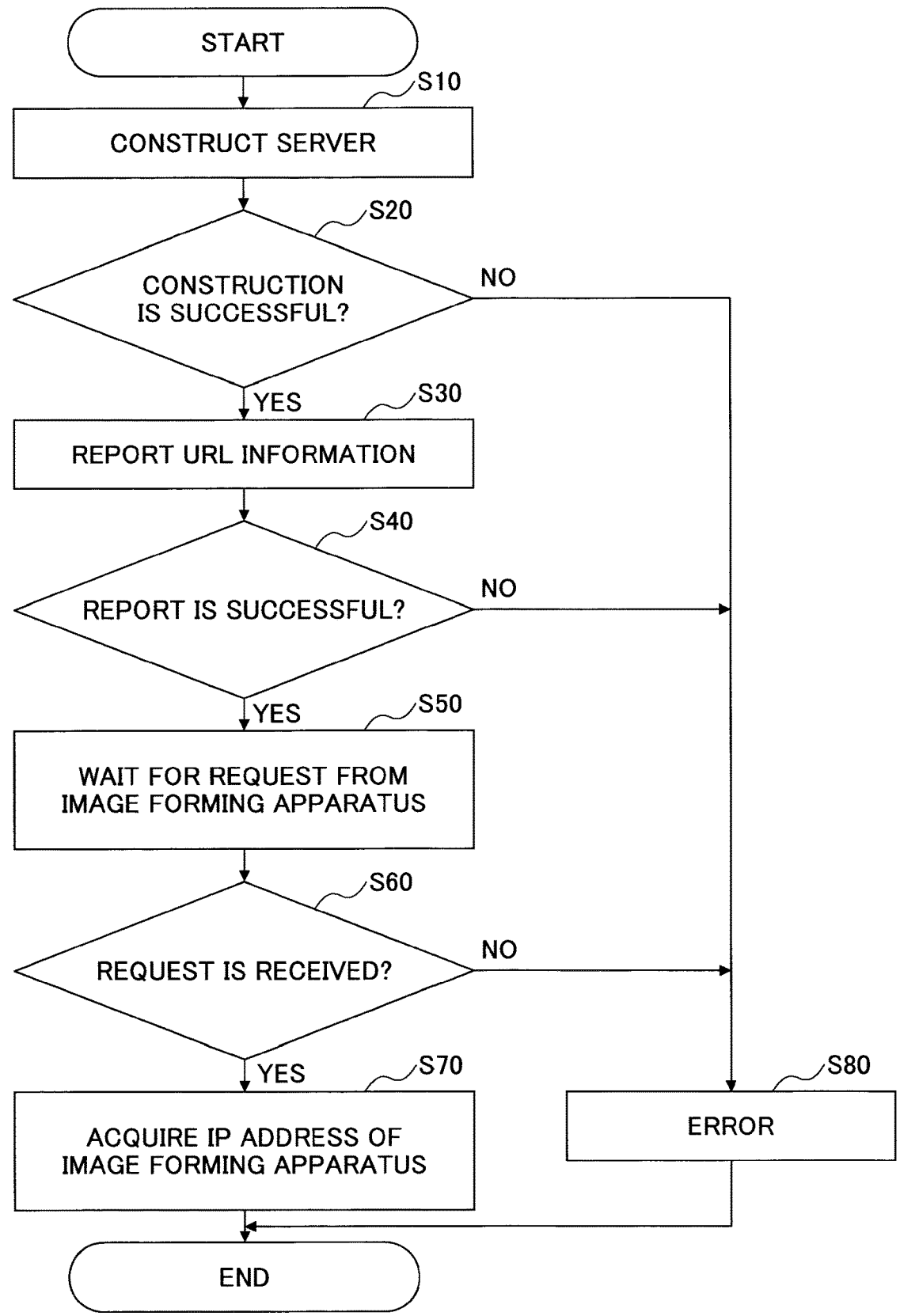

[Fig. 13]
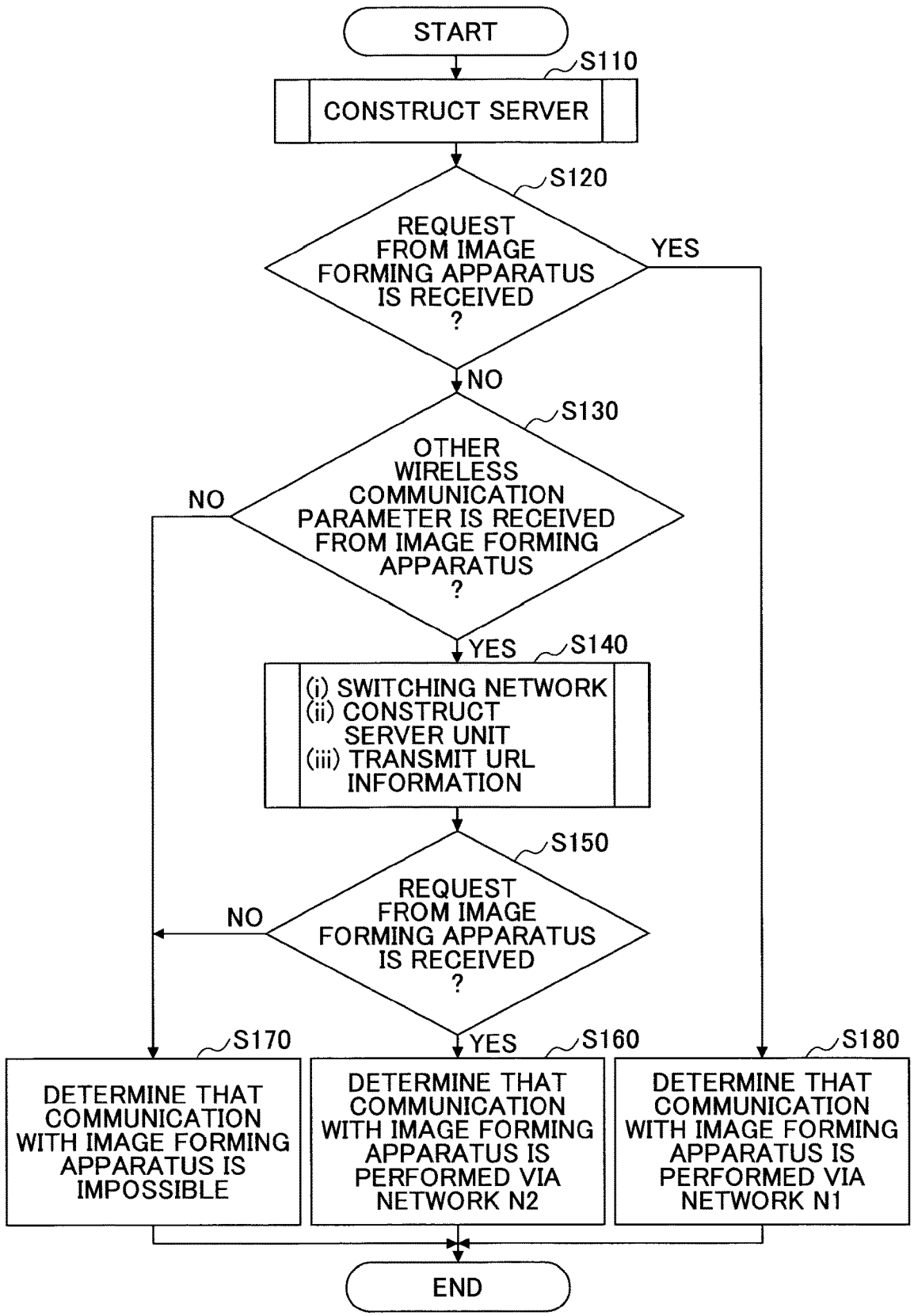

[Fig. 14]
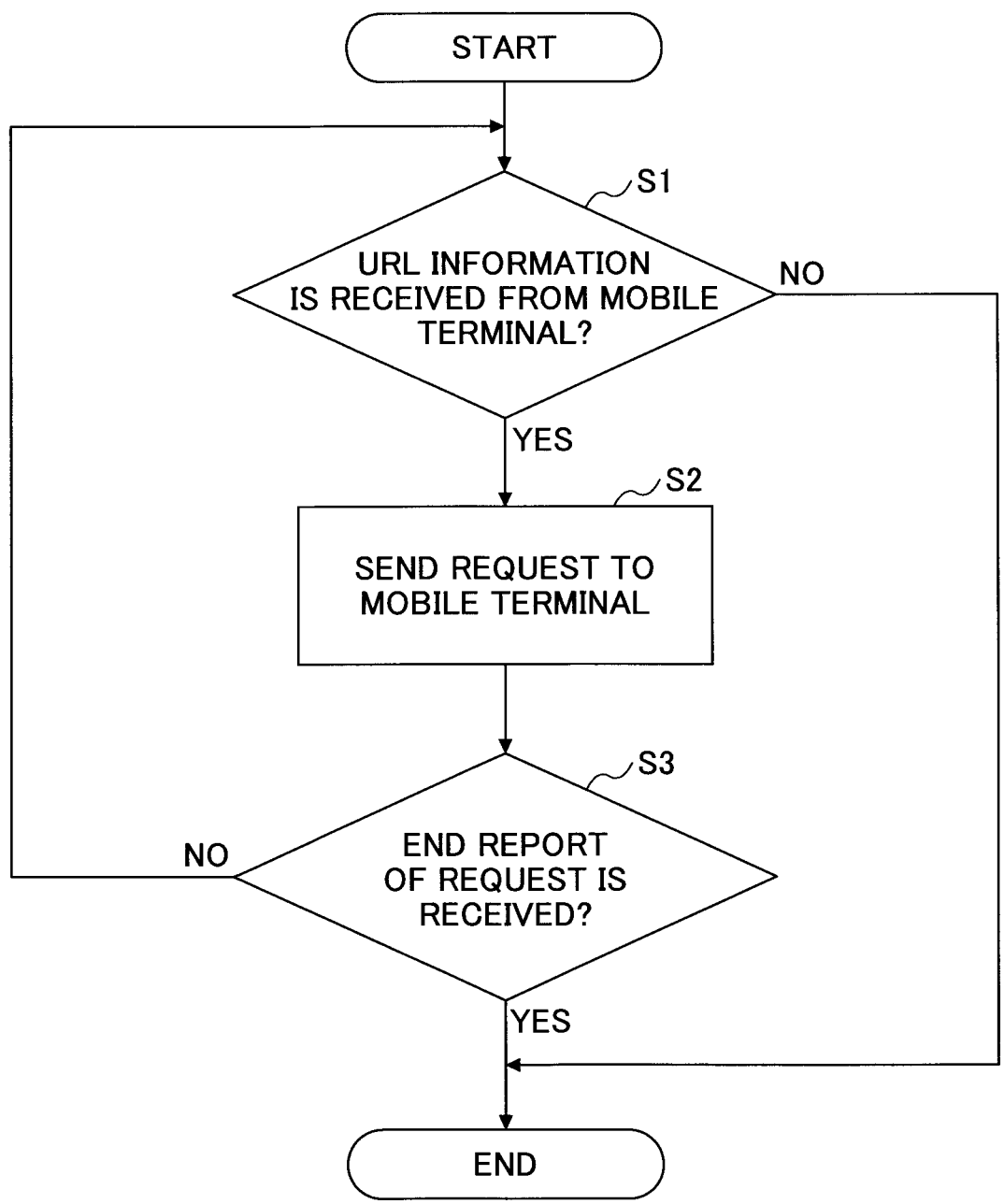

[Fig. 15]
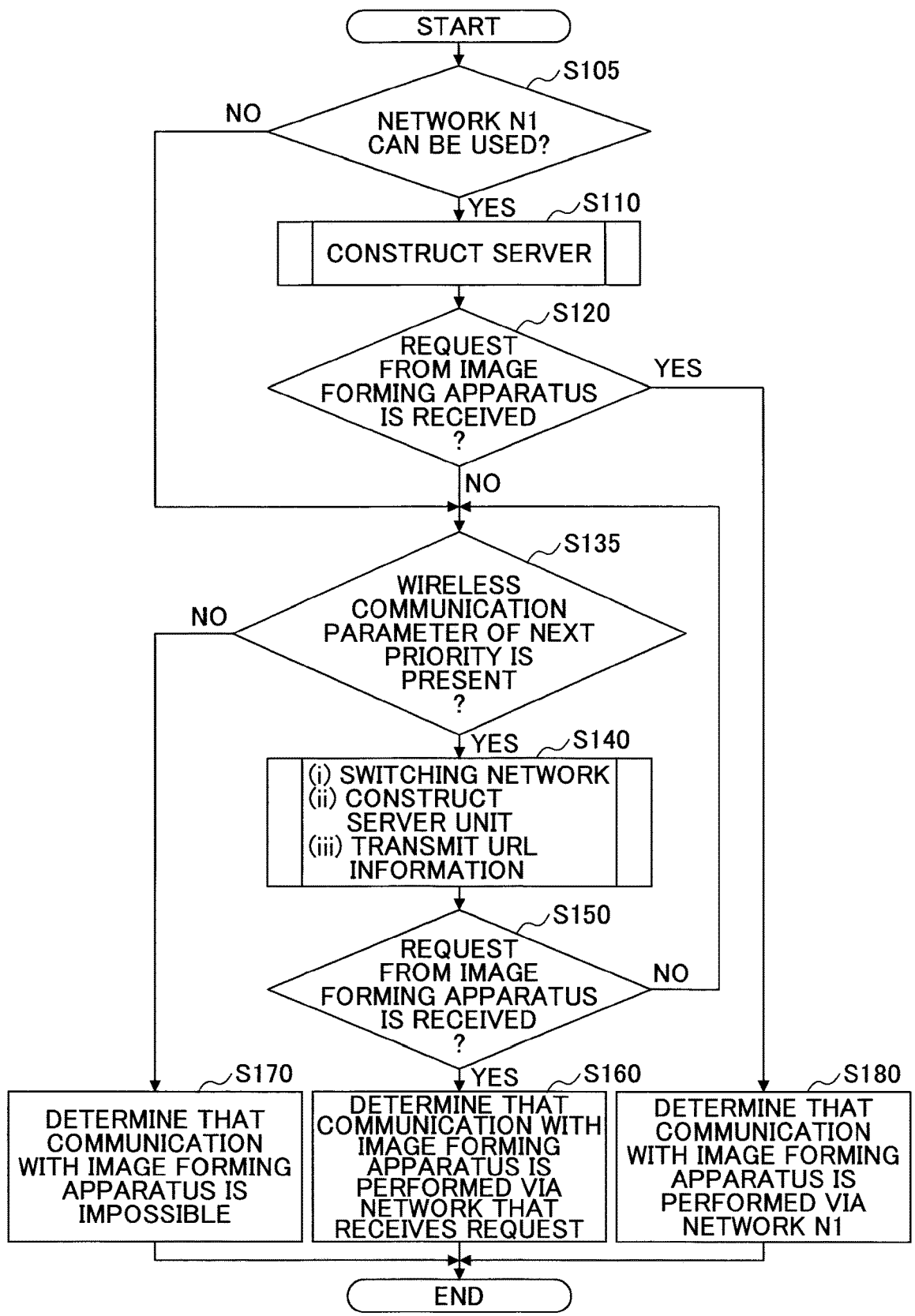

[Fig. 16]
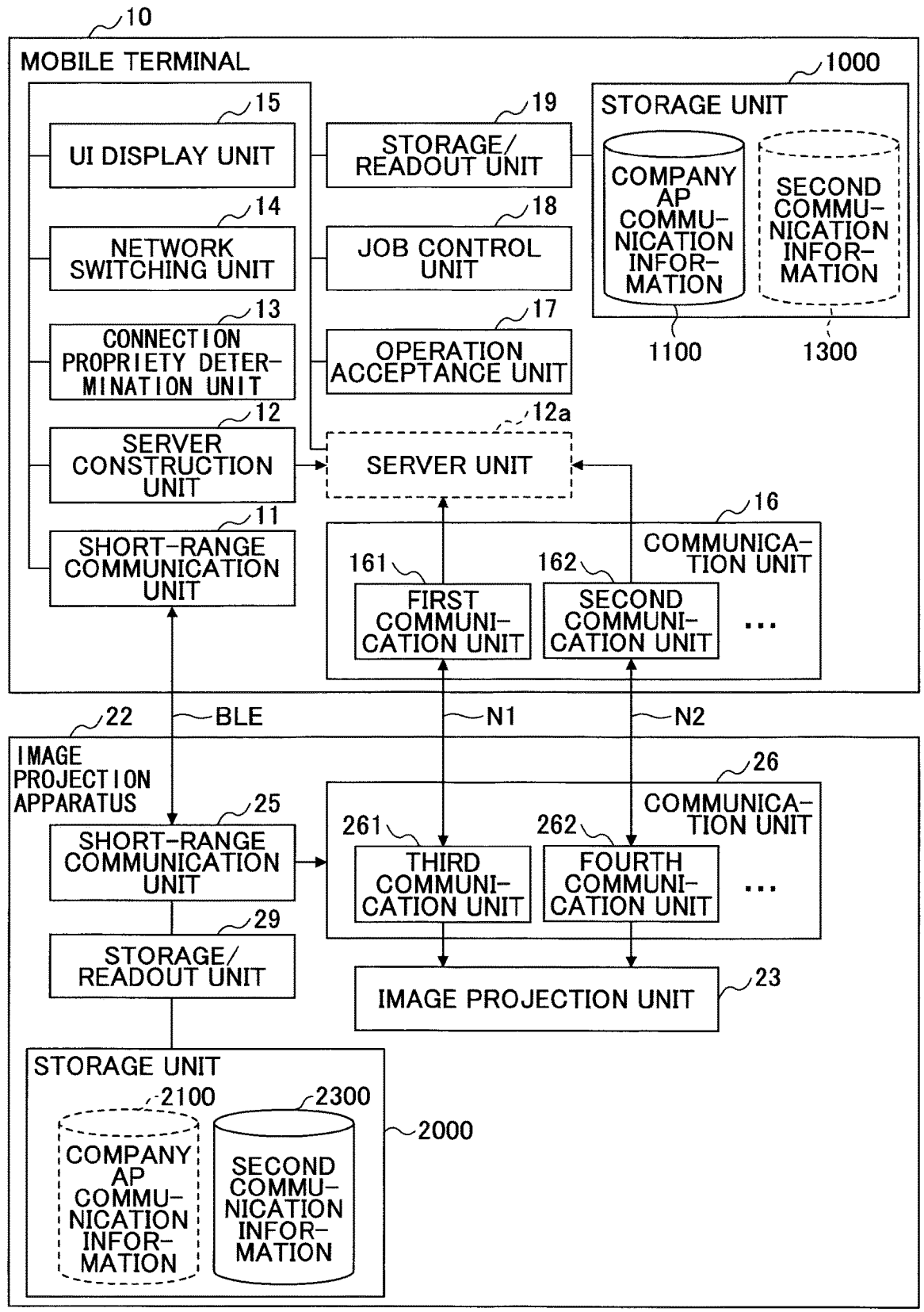

[Fig. 17]
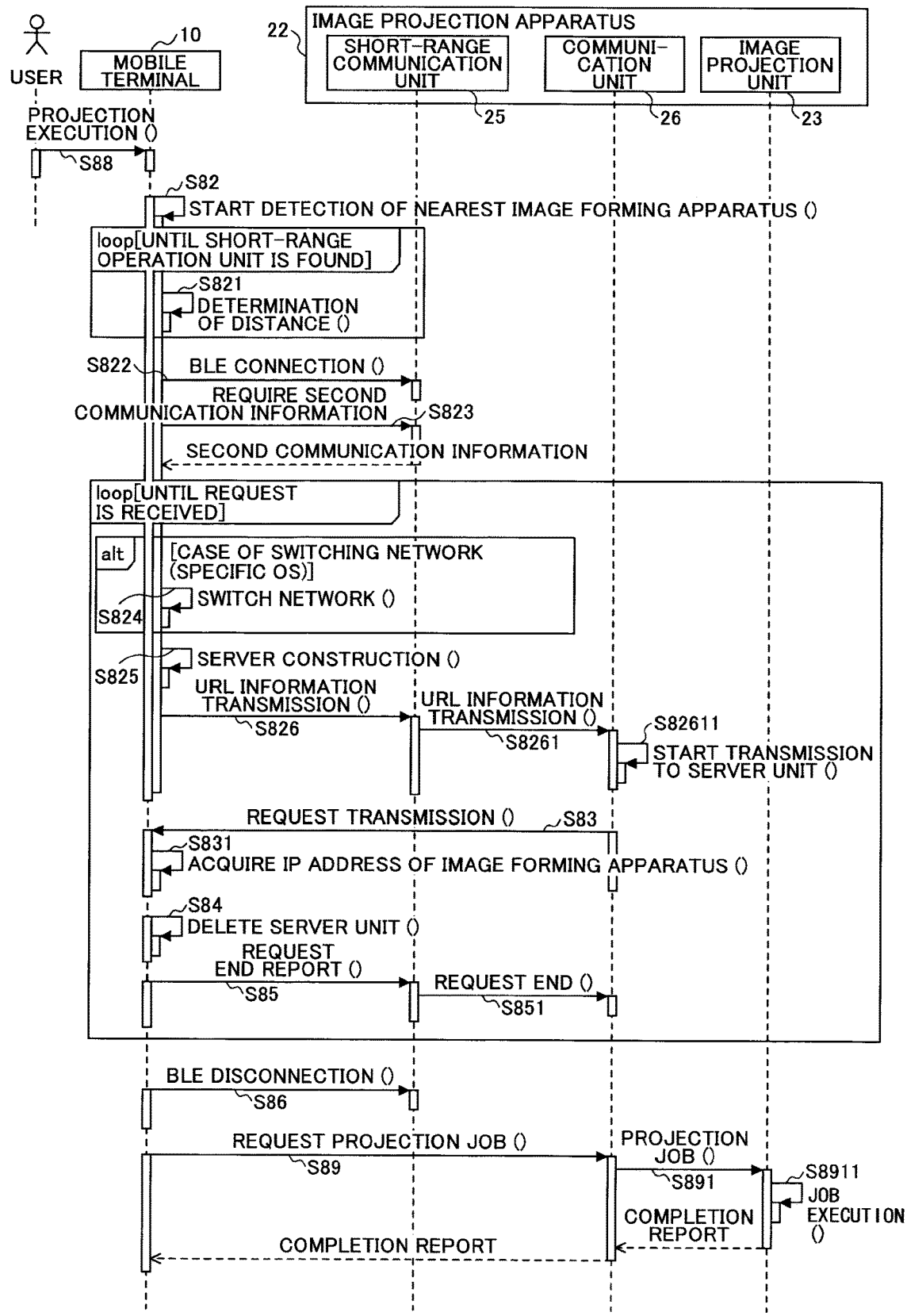

INFORMATION PROCESSING APPARATUS, INFORMATION PROCESSING SYSTEM, AND INFORMATION PROCESSING METHOD CONFIGURED TO CONSTRUCT A SERVER IN THE MOBILE TERMINAL THROUGH WHICH AN OUTPUT DEVICE COMMUNICATES WITH THE MOBILE TERMINAL USING A COMMUNICATION INFORMATION

TECHNICAL FIELD

The disclosure herein generally relates to an information processing apparatus, an information processing system, and an information processing method.

BACKGROUND ART

When a user who retains a terminal can cause the terminal to communicate with another device, such as an image forming apparatus, by wireless communication, to use a function of the other device, it is convenient because connection by wire is not necessary. However, the wireless communication for the terminal with the device often requires a parameter for wireless communication. Moreover, setting of the wireless communication parameter for the device is not always easy.

Then, conventionally, techniques for setting wireless communication parameters to the terminal without user's setting or with minimized user's setting have been devised (see, for example, Patent document 1). Patent document 1 discloses a management apparatus which reads out information stored in a user's NFC (Near Field Communication) chip, so as to connect a wireless communication device using different wireless communication parameters for the same device, and sets a wireless communication parameter for home or a wireless communication parameter for a visiting destination for a wireless communication apparatus.

CITATION LIST

Patent Literature

PTL 1: Japanese Patent No. 5121212

SUMMARY OF INVENTION

Technical Problem

However, the method of setting wireless communication parameter disclosed in Patent document 1, has a problem that it is difficult for the user to determine which wireless communication parameter is selected among a plurality of wireless communication parameters.

The above-described problem will be explained using a specific example. Assume that an image forming apparatus is coupled to an employee network dedicated for employees and to a guest network for guests, for example. In this case, when the NFC chip stores a wireless communication parameter for each network, the terminal that the user carries can read out the wireless communication parameter from the NFC chip, and set the parameter to the terminal. However, in general a guest should not access the employee network, and the employee should communicate with the device via the employee network shielded from outside rather than the guest network. That is, a user should be coupled to the image forming apparatus via an appropriate network, but even if a wireless communication parameter can be acquired, it is often difficult to determine which wireless communication parameter should be selected by the user.

The present invention is made in consideration of the above-mentioned problem, and aims at providing an information processing apparatus, an information processing system and an information processing method that enable transmitting a request to a device, which can be coupled to a plurality of networks, without causing the user to specify a network, when the request is transmitted to the device.

Solution to Problem

According to an aspect of the invention, an information processing apparatus is coupled to a device via at least one of a plurality of networks. The information processing apparatus includes a memory having computer readable instructions and at least one processor configured to execute the computer readable instructions to transmit to the device first communication information for the device communicating with the information processing apparatus, when a process is requested from the device; determine whether the information processing apparatus can communicate with the device via a first network to which the device is coupled according to whether the device communicates with the information processing apparatus using the first communication information; connect to a second network that is different from the first network using second communication information for connecting to the second network, the second communication information being acquired upon transmitting the first communication information to the device, when the device is determined not to communicate with the information processing apparatus via the first network; and determine whether the information processing apparatus can communicate with the device via the second network according to whether the device communicates with the information processing apparatus using the first communication information via the second network.

Advantageous Effects of Invention

According to embodiments of the present invention, an information processing apparatus, an information processing system, and an information processing method that enable transmitting a request to a device, which can be coupled to a plurality of networks, without causing a user to specify a network, when the request is transmitted to the device can be provided.

BRIEF DESCRIPTION OF DRAWINGS

FIG. 1A is a diagram depicting an example for explaining a main use case assumed in a print system according to an embodiment.

FIG. 1B is a diagram depicting another example for explaining the main use case assumed in the print system according to the embodiment.

FIG. 2 is a configuration diagram depicting an example of the print system according to the first example.

FIG. 3 is a hardware configuration diagram depicting an example of a mobile terminal.

FIG. 4 is a hardware configuration diagram depicting an example of an image forming apparatus.

FIG. 5 is a functional block diagram depicting an example of a print system.

FIG. 6 is a diagram depicting an example for explaining URL information and a URL.

FIG. 7 is a diagram depicting an example for explaining a function of a server unit using a sequence diagram.

FIG. 8 is a sequence diagram depicting an example of a print process.

FIG. 9A is a diagram depicting an example of a screen displayed on the mobile terminal.

FIG. 9B is a diagram depicting another example of the screen displayed on the mobile terminal.

FIG. 10A is a diagram depicting yet another example of the screen displayed on the mobile terminal.

FIG. 10B is a diagram depicting still another example of the screen displayed on the mobile terminal.

FIG. 11 is a diagram depicting yet another example of the screen displayed on the mobile terminal.

FIG. 12 is a flowchart depicting an example for explaining details of a process by the mobile terminal of constructing the server unit and accepting a request.

FIG. 13 is a flowchart depicting an example for explaining details of a process of determining whether the mobile terminal can be connected to a network N1 or N2.

FIG. 14 is a flowchart depicting an example for explaining a process of connecting by the image forming apparatus to the mobile terminal.

FIG. 15 is a flowchart depicting an example for explaining details of a process of determining whether the mobile terminal can be connected to the networks N1 to N3 according to an order of priority.

FIG. 16 is a functional block diagram depicting an example of a print system according to a second example.

FIG. 17 is a sequence diagram depicting an example of a print process in a print processing system according to the second example.

DESCRIPTION OF EMBODIMENTS

In the following, embodiments of the present invention will be described in detail with reference to the accompanying drawings.

<Use Case of Print System According to the Embodiment>

First, with reference to FIG. 1, a main use case assumed for a print system 1 according to the embodiment will be described. FIGS. 1A and 1B are diagrams depicting an example for explaining the main use case assumed for the print system 1 according to the embodiment. An image forming apparatus 20 is coupled to a network N1 corresponding to a company LAN or the like, and an access point 7 is coupled to the network N1 (first network). Moreover, the image forming apparatus 20 can communicate via a network N2 (second network) which communicates by P2P (Peer to Peer).

<<First Use Case>>

A first use case is a case where a guest 9 wirelessly communicates with the image forming apparatus 20 for printing or the like using an own mobile terminal 10. The first use case will be explained with reference to FIG. 1A.

(1) First, the guest 9 causes the own mobile terminal 10 to approach a short-range wireless communication device 206 included in the image forming apparatus 20. Then, the mobile terminal 10 forms a network BLE to communicate with the short-range wireless communication device 206 using a short-range wireless communication device 109 included in the mobile terminal 10, acquires from the image forming apparatus 20 second communication information 1300 for communicating with the image forming apparatus 20 via the network N2.

(2) Moreover, the mobile terminal 10 communicates with the short-range wireless communication device 206 via the network BLE by the short-range wireless communication device 109 included in the mobile terminal 10, and sends to the image forming apparatus 20 URL (Uniform Resource Locator) information 5000 when the mobile terminal 10 operates as a server.

(3) Because the image forming apparatus 20 is coupled to the network N1, the image forming apparatus 20 tries to communicate with the mobile terminal 10 via the network N1 by URL prepared by using the URL information 5000. However, because for the mobile terminal 10, a wireless communication parameter for coupling to the access point 7 is not set, the mobile terminal 10 cannot be coupled to (is not coupled to) the network N1. Therefore, the image forming apparatus 20 cannot be coupled to the mobile terminal 10 via the network N1 even when the image forming apparatus uses the URL information 5000.

(4) When the mobile terminal 10 determines that communication from the image forming apparatus 20 to a server constructed by the mobile terminal 10 is absent, the mobile terminal 10 sets the second communication information 1300 to the own terminal, to enable the communication via the network N2.

(5) Because according to the above-described operations, the image forming apparatus 20 can communicate with the mobile terminal 10 via the network N2 by the URL prepared by using the URL information 5000, the mobile terminal 10 detects communication from the image forming apparatus 20 to the server constructed by the mobile terminal 10. Moreover, when detecting this communication, the mobile terminal 10 can acquire an IP address 3000 of the image forming apparatus 20. The mobile terminal 10 can require the image forming apparatus 20 specified by the IP address 3000 via the network N2 to perform a process.

Therefore, the mobile terminal 10 of the guest 9 can communicate with the image forming apparatus 20 but not via the network N1 that is a company LAN.

<<Second Use Case>>

A second use case is a case where an employee 8 wirelessly communicates with the image forming apparatus 20 of the other department, which the employee does not use usually, for printing or the like using an own mobile terminal 10. The second case will be explained with reference to FIG. 1B.

(1) First, the guest 9 causes the own mobile terminal 10 to approach the short-range wireless communication device 206 included in the image forming apparatus 20. Then, the mobile terminal 10 forms the network BLE that communicate with the short-range wireless communication device 206 using the short-range wireless communication device 109 included in the mobile terminal 10, acquires from the image forming apparatus 20 second communication information 1300 for communicating with the image forming apparatus 20 via the network N2.

(2) Moreover, the mobile terminal 10 sends via the network BLE to the image forming apparatus 20 URL (Uniform Resource Locator) information 5000 when the mobile terminal 10 operates as a server.

(3) The image forming apparatus 20 is coupled to the network N1, and to the mobile terminal 10 of the employee 8 that has a privilege of connecting to the company LAN of the own company, company AP communication information 1100 for connecting to the access point 7 is set. Therefore, the mobile terminal 10 is coupled to the network N1. When the image forming apparatus 20 tries to communicate with the mobile terminal by the URL prepared by the URL information 5000 via the network N1, the image forming apparatus 20 can communicate. The mobile terminal 10 detects communication from the image forming apparatus 20 to the server constructed the mobile terminal 10, and acquires also the IP address 3000 of the image forming apparatus 20, Therefore, the mobile terminal 10 of the employee 8 can require the image forming apparatus 20 specified by the IP address 3000 via the network N1 that is a company LAN to perform a process.

Moreover, even if the mobile terminal 10 of the employee 8 cannot be coupled to the image forming apparatus 20 via the network N1, the mobile terminal 10 of the employee 8 can communicate with the image forming apparatus 20 via the network N2. Therefore, even when the network N1 cannot be used according to a reason of not having the company AP communication information 1100 or the like, temporary printing is possible.

In this way, the print system 1 according to the embodiment reduces labor of setting wireless communication parameters by a user, and enables each user such as the guest 9 or the employee 8 to select automatically a proper network.

<Regarding Technical Terms>

An employee is one of specific examples of users of the mobile terminal 10 and the image forming apparatus 20, and is a user who has a privilege of connecting to the company LAN (A wireless communication parameter for connecting to the company LAN is set to the mobile terminal 10). The user may not be referred to as the employee 8, but may be called an official, a worker, a staff person, or the like.

A guest is one of specific examples of users of the mobile terminal 10 and the image forming apparatus 20, and is a user who does not have the privilege of connecting to the company LAN. All users other than the employees are included in the guests 9. Moreover, the guest also may be called in any way.

Connection refers to connecting to a network or confirming whether to communicate with an apparatus on the other side (communication for determining whether to communicate).

Communication refers to transmission of various pieces of information at least from an apparatus to another apparatus. However, the connection and the communication may not be distinguished strictly from each other.

First communication information is resource specification information for specifying a resource on a network, and can be referred to as resource specification information for which the image forming apparatus 20 specifies the mobile terminal 10 and communicates with the mobile terminal. For example, an IP address of the mobile terminal 10 is included. However, when the constructed server is virtualized, the first communication information may not be the IP address of the mobile terminal 10 itself. Moreover, the first communication information may be referred to as URL information or URI (Uniform Resource Identifier) information in a sense of specifying a resource on a network. In the embodiment, the first communication information is referred to as the URL information 5000 for explanation.

Second communication information is a wireless communication parameter for the mobile terminal 10 to connect to the network N2 different from the first network N1 that is the company LAN. By setting the second communication information 1300 to the mobile terminal 10, the mobile terminal 10 can be coupled to the network N2. In order to communicate with the image forming apparatus 20, URI (e.g. an IP address) of the image forming apparatus 20 is further necessary. Therefore, the second communication information 1300 may be called network connection information. In the embodiment, the second communication information is referred to as the second communication information 1300 for explanation.

First Example

<System Configuration>

With reference to FIG. 2, a system configuration of the print system 1 according to the first example will be described. FIG. 2 is a configuration diagram depicting an example of the print system according to the first example. The print system 1 illustrated in FIG. 2 includes a mobile terminal 10 and one or more image forming apparatuses 20. The mobile terminal 10 and the image forming apparatus 20 are configured so as to be coupled with each other by wire or wirelessly, via the network N1, the network N2 and the network BLE. Because the mobile terminal 10 is an information processing device carried by a user, as described later, the mobile terminal 10 and the image forming apparatus 20 are preferably configured so as to be wirelessly connectable via the network N1, the network N2 and the network BLE. Being connectable refers to being provided with a function of connecting, and whether to be actually connected is different depending on determination, which will be described with reference to FIG. 8.

The network N1 and the network N2 are different networks from each other though both networks used a wireless LAN. Being different networks in the embodiment refers to another wireless communication parameter being necessary for connection, e.g. SSID (Service Set Identifier) being different.

Moreover, when the mobile terminal 10 is carried by the guest 9, the mobile terminal 10 is not connected to the network N1, but is connected to the network N2 on demand. Moreover, the employee 8 has a privilege of connecting to the network N1 in advance. Therefore, when the mobile terminal 10 is carried by the employee 8, because to the mobile terminal 10, as the above-described wireless communication parameter, for example, SSID and a password (encryption key) are set, the mobile terminal 10 can be connected to the network 1. Therefore, the mobile terminal 10 carried by the employee 8 can communicate with the image forming apparatus 20 when the IP address 3000 of the image forming apparatus 20 is obtained.

In the following description, as an example, the network N1 is assumed to be a network, such as a company network, in which the mobile terminal 10 is coupled to the image forming apparatus 20 via the wireless LAN (Local Area Network). On the other hand, the network N2 is assumed to be a network for connecting directly to the image forming apparatus 20 in P2P by Wi-Fi Direct. Moreover, the network BLE is assumed to be a network for connecting directly to the image forming apparatus 20 in P2P by Bluetooth (trademark registered, in the following will be omitted) Low Energy, for the following explanation. However, the network N1 and the network N2 are not limited to them. For example, the network N1 may include a WAN or the Internet, other than the network such as the company LAN, and may include partially a mobile phone network. Moreover, the network N2 may be a network for connecting to the image forming apparatus 20 via an ad hoc mode of the wireless LAN, the mobile phone network, an infrared communication, Bluetooth, or the like. That is, the network N2 may be any network that does not enter the company, such as the company LAN. Moreover, the network N2 may be a company network for connecting the image forming apparatus 20 via a wireless LAN, for example, as long as the network N2 is properly configured, such as being separated from the network N1 (for example, a network separated by a firewall). Moreover, the network BLE may be any communication method that can communicate even if a wireless communication parameter is not obtained. More preferably, the network BLE may be a communication method that allows communication only in a short-range, such as a NFC reader writer, an infrared communication, ZigBee (trademark registered), or WiGig.

The mobile terminal 10 is a portable information processing device such as a smartphone operated by a user. The mobile terminal 10 may be a smartphone, a mobile phone, a tablet type terminal, a gaming machine, a PDA (Portable Digital Assistant), a digital camera, a wearable PC, a laptop PC, or the like. In the mobile terminal 10, an application is installed for requiring the image forming apparatus 20 to provide a function (e.g. performing print instruction to print object data, causing to scan a document, causing to transmit facsimile, causing to make a copy, or the like). The mobile terminal 10 generates a print job including print object data related to the print instruction, a scan job, a facsimile transmission job, a copying job, and the like, and requires the image forming apparatus 20 to perform these processes.

The application may be software, such as browser that communicates with the image forming apparatus and requires the image forming apparatus 20 to execute a job, document preparation software, or a viewer.

The image forming apparatus 20 is a device that accepts a request for process, and can accept the request for process from any of the plurality of networks. The image forming apparatus 20 is, for example, is a device, such as a printer, that accepts a printing job or the like from the mobile terminal 10, and performs printing for the print object data. The image forming apparatus 20 may be an MFP (Multi-function peripheral/Printer/Product) having a plurality of functions, such as a copying function, a scanning function, or a facsimile function, in addition to the printing function.

Moreover, the image forming apparatus 20 may be, for example, an output device such as a scanner apparatus, a facsimile apparatus, an image projection apparatus (a projector), a rear projector, a HUD (Head Up Display), or an electronic whiteboard, digital signage, or a sound output device such as a speaker device. Therefore, in the first example, the print system 1 will be described as an example of the information processing system, but not limited to this. For example, instead of the image forming apparatus 20, the print system 1 may be an image output system using the image output apparatus, or a sound output system using the speaker device instead of the image forming apparatus 20. That is, the first example can be applied to respective systems, each using the mobile terminal 10 that generates various jobs, an image, or data to be converted into an image, and a device that can output the various jobs, the image, or the data to be converted in to an image, received from the mobile terminal 10 (in the first example, the image forming apparatus 20). Moreover, the mobile terminal 10 may only wirelessly communicate with the device without outputting data.

The image forming apparatus 20 stores the second communication information 1300 for the mobile terminal 10 to connect to the network N2. Moreover, the image forming apparatus 20 has a fixed IP address 3000 or an IP address 3000 given by the DHCP (Dynamic Host Configuration Protocol) server. Furthermore, the image forming apparatus 20 may store the company AP communication information 1100 for the mobile terminal 10 to connect to the network N1. However, in this case, the company AP communication information 1100 preferably is not provided to the mobile terminal 10, or when provided, preferably encrypted. When the user is an employee 8, the user is assumed to be able to decode the company AP communication information 1100.

Furthermore, the image forming apparatus 20 may not store the second communication information 1300. In this case, a device or guideboard having a short-range wireless communication device 206 arranged close to the image forming apparatus 20 or in a passage may store the second communication information 1300. The mobile terminal 10 can acquire second communication information 1300 stored in the image forming apparatus 20 using the short-range wireless communication device 109. Then, as explained with reference to FIGS. 1A and 1B, the mobile terminal 10 is coupled to the network N2 based on the second communication information 1300, and accepts communication from the image forming apparatus 20 by the URL prepared by using the URL information 5000 by the image forming apparatus 20. Moreover, by sending a print job via the network N2 from the mobile terminal 10, the user can execute the print job in the image forming apparatus 20.

The path via which the second communication information 1300 is provided is not limited to the communication between the short-range wireless communication device 109 and the short-range wireless communication device 206. For example, when the image forming apparatus 20 incorporates an NFC module, or is connected to an NFC reader/writer, the image forming apparatus 20 may report the second communication information 1300 by using the NFC module or the NFC reader/writer. In this case, the mobile terminal 10 can read out the second communication information by an NFC tag reader. Moreover, in order to send the URL information 5000, the mobile terminal 10 writes the URL information 5000 into the NFC module incorporated in the image forming apparatus 20 or into the connected NFC reader/writer by using the NFC writer. The image forming apparatus 20 reads out the URL information 5000 from the NFC module or the NFC reader/writer.

The above-described print system 1 is configured so that the mobile terminal 10 and the image forming apparatus 20 can be coupled to each other via two networks, i.e. the network N1 and the network N2, except for the network BLE. However, the number of connectable networks may be an arbitrary number greater than or equal to one (e.g. three or more).

Moreover, the above-described print system 1 may have, for example, a configuration provided with a print server that accumulates print jobs sent from the mobile terminal 10. Furthermore, the print system 1 may have a configuration including an arbitrary number, but one or more, of mobile terminals 10.

<Hardware Configuration>
<<Mobile Terminal>>

The mobile terminal 10 according to the first example is, for example, enabled by a hardware configuration, as illustrated in FIG. 3. FIG. 3 is a hardware configuration diagram depicting an example of the mobile terminal according to the first example. The mobile terminal 10, illustrated in FIG. 3, includes an input device 101, a display device 102, an external interface 103, a RAM (Random Access Memory) 104, a ROM (Read-Only Memory) 105, a CPU (Central Processing Unit) 106, a communication interface 107, an SSD (Solid State Drive) 108, a short-range wireless communication device 109, and the like. The respective elements are coupled to each other via a bus B.

The input device 101 is, for example, a touch panel, and used for inputting various operation signals to the mobile terminal 10. The input device 101 may be a keyboard or a mouse. The display device 102 is, for example, a LCD (Liquid Crystal Display), and displays a result of process by the mobile terminal 10.

The external interface 103 is an interface with an external device. The external device includes, for example, a recording medium 103a. The recording medium 103a can store a program that enables the first example. The mobile terminal 10 can readout/write from/into the recording medium 103a via the external interface 103.

The recording medium 103a is, for example, a recording medium, such as an SD memory card. The recording medium 103a may be a USB (Universal Serial Bus) memory, a DVD (Digital Versatile Disk), a CD (Compact Disk), a flexible disk, or the like.

The RAM 104 is a volatile semiconductor memory (storage device) that temporarily stores a program or data. The ROM 105 is a non-volatile semiconductor memory (storage device) that can retain a program or data even when the power is OFF. The ROM stores a program or data, such as BIOS (Basic Input/Output System) that is executed when the mobile terminal 10 starts, an OS configuration, and a network configuration.

The CPU 106 is an arithmetic device that reads out a program or data from the storage device, such as the ROM 105, the SSD 108, or the like onto the RAM 104, and executes processes, and thereby enables a control of the entire mobile terminal 10 or a function of the mobile terminal 10.

The communication interface 107 is an interface for performing communication via the network N1 and the network N2. For example, the communication interface 107 is an interface for connecting the mobile terminal 10 to the company LAN or the like via a wireless LAN. Moreover, the communication interface 107 is an interface for connecting to the image forming apparatus 20 via Wi-Fi Direct. Accordingly, the mobile terminal 10 can perform data communication via the communication interface 107. The communication interface 107 may be an interface for connecting to the mobile phone network, the Internet, or the like.

The SSD 108 is a non-volatile storage device that stores a program 108a or data. The stored program 108a or data include, for example, an OS (Operating System) that is basic software controlling the entire mobile terminal 10, or application software (in the following, simply referred to as "application") that provides various functions on the OS. The SSD 108 manages the stored program or data by a predetermined file system and/or DB (database). The mobile terminal 10 may be provided with an HDD (Hard Disk Drive) or the like instead of the SSD 108 or with the SSD 108.

The short-range wireless communication device 109 is coupled to the network BLE based on the communication standard of Bluetooth Low Energy, for example, and communicates with the image forming apparatus 20. Bluetooth Low Energy is one of the extended specifications of the conventional Bluetooth (referred to as classic Bluetooth), and is a communication standard in which communication with extremely low electric power is possible. Because in Bluetooth Low Energy, a pairing using the PIN code (corresponding to the wireless communication parameter) that is necessary in the classic Bluetooth becomes unnecessary, within a reach of a wireless electric wave, communication is possible. Moreover, the short-distance wireless communication device 109 may be an NFC reader/writer. The short-range wireless communication device 109 may be incorporated or externally attached.

The mobile terminal 10 according to the first example enables various processes, which will be described later, by the above-described hardware configuration.

<<Image Forming Apparatus>>

The image forming apparatus 20 according to the first example is enabled by a hardware configuration as illustrated in FIG. 4, for example. FIG. 4 is a hardware configuration diagram depicting an example of the image forming apparatus according to the first embodiment. The image forming apparatus 20 illustrated in FIG. 4 includes a controller 201, an operation panel 202, an external interface 203, a communication interface 204, a printer 205, a short-range wireless communication device 206, an RFID tag 207, and the like.

The controller 201 includes a CPU 211, a RAM 212, a ROM 213, a NVRAM 214, and an HDD 215. The ROM 213 stores various programs or data. The RAM temporarily retains a program or data. The NVRAM 214 stores, for example, configuration information. Moreover, the HDD stores various programs 215a or data.

The CPU 211 reads out the program 215a, data, the configuration information, or the like from the ROM 213, NVRAM 214, or the HDD 215 onto the RAM 212, executes processes, and thereby enables a control of the entire image forming apparatus 20 or a function of the image forming apparatus 20.

The operation panel 202 is provided with an input unit for accepting an input from a user, and a display unit for performing display. The external interface 203 is an interface with an external device. The external device includes a recording medium 203a or the like. Therefore, the image forming apparatus 20 can readout/write from/into the recording medium 203a via the external interface 203. The recording medium 203a includes a flexible disk, a CD, a DVD, an SD memory card, a USB memory or the like.

The communication interface 204 is an interface for performing communication via the network N1 and the network N2. Therefore, the image forming apparatus 20 can perform data communication via the communication interface 204. The printer 205 is a print device for printing and outputting print object data.

The short-range wireless communication device 206 is coupled to the network BLE based on the communication standard of Bluetooth Low Energy, in the same way as the short-range wireless communication device 109, and communicates with the mobile terminal 10. Moreover, the short-range wireless communication device 206 may be an NFC module or an NFC reader/writer. In addition, the short-range wireless communication device 206 may be incorporated or externally attached.

The image forming apparatus 20 according to the first example enables various processes, which will be described later, by the above-described hardware configuration.

<Software Configuration>

The print system 1 according to the first example can be illustrated, for example, by a functional block as illustrated in FIG. 5, for example. FIG. 5 is a functional block diagram depicting an example of the print system 1 according to the first example.

<<Mobile Terminal>>

The mobile terminal 10 of the print system 1 includes a short-range communication unit 11, a server construction unit 12, a connection propriety determination unit 13, a network switch unit 14, a UI display unit 15, a communication unit 16, an operation acceptance unit 17, a job control unit 18, a storage/readout unit 19, and the like. Moreover, the communication unit 16 includes a first communication unit 161, a second communication unit 162, and the like. The respective function units are functions or means enabled by the CPU 106 executing the program 108a stored in the SSD 108, to control any of the respective elements, with which the mobile terminal 10 is provided. A part of or all of the respective function units may be enabled on hardware (an IC circuit or the like).

Moreover, the mobile terminal 10 includes a storage unit 1000 enabled by the SSD 108, the RAM 104, the ROM 105, or the like. The storage unit 1000 includes the company AP communication information 1100. Moreover, when the mobile terminal 10 acquires the second communication information 1300 from the image forming apparatus 20, the storage unit 1000 also stores the second communication information 1300. First, the company AP communication information 1100 and the second communication information 1300 will be described.

TABLE 1

| NETWORK N1 | | |
|---|---|---|
| ITEM NAME | ITEM VALUE | |
| SSID | 123ABC | |
| PASSWORD | ****** | |
| ENCRYPTION SCHEME | WPA/WPA2-PSK | 1100 |
| HTTP PORT NUMBER | 80 | |
| HTTPS PORT NUMBER | 443 | |
| ... | ... | |

TABLE 1 schematically depicts an example of the company AP communication information 1100. The company AP communication information 1100 is information necessary for the mobile terminal 10 to communicate with the image forming apparatus 20 via the network N1 (e.g. including partially a wireless LAN). The company AP communication information 1100 includes information such as SSID (Service Set Identifier) for identifying a wireless part of the network N1, an encryption scheme in the network N1, password, an HTTP (HyperText Transfer Protocol) port number upon performing communication via the network N1, an HTTPS (HTTP over SSL/TLS (Secure Sockets Layer/Transport Layer Security)) port number, and the like. The HTTP port number and the HTTPS port number are port numbers for connecting from the mobile terminal 10 to the image forming apparatus 20. In the embodiment, because the HTTP port number and the HTTPS port number in the company AP communication information can double as the HTTP port number and the HTTPS port number in the second communication information 1300, respectively, the port numbers may be extracted from the second communication information 1300. For example, because the port numbers of 80 and 443 are known, the HTTP port number and the HTTPS port number may be absent in TABLE 1.

As described above, the network N1 is assumed to be connected to by the employee 8, and in the mobile terminal 10 of the employee 8, the company AP communication information 1100 is set in advance. On the other hand, the mobile terminal 10 of the guest 9 does not store the company AP communication information 1100. Therefore, only the mobile terminal 10, in a state of being coupled to the company LAN, can be coupled to the image forming apparatus 20. Moreover, when the mobile terminal 10 is in the state of being coupled to the company LAN, the communication may start from the image forming apparatus 20.

TABLE 2

| NETWORK N2 | | |
|---|---|---|
| ITEM NAME | ITEM VALUE | |
| SSID | 456DEF | |
| PASSWORD | ****** | |
| ENCRYPTION SCHEME | WPA/WPA2-PSK | |
| HTTP PORT NUMBER | 80 | |
| HTTPS PORT NUMBER | 443 | 1300 |
| PORT NUMBER OF SERVER FOR MOBILE TERMINAL | 50000 | |
| ... | ... | |

TABLE 2 schematically depicts an example of the second communication information 1300. The second communication information 1300 is a wireless communication parameter sent from the image forming apparatus 20 or the like. The second communication information 1300 is information necessary for the mobile terminal 10 to connect to the network N2 (e.g. P2P by Wi-Fi Direct) and communicate with the image forming apparatus 20. The second communication information 1300 includes information such as SSID for identifying the network N2, an encryption scheme in the network N2, password, an HTTP (HyperText Transfer Protocol) port number upon performing communication via the network N2, an HTTPS (HTTP over SSL/TLS) port number, a port number of a server for the mobile terminal, and the like. When the image forming apparatus does not communicate data without encryption, transmission itself is possible without password. The port number of the server for the mobile terminal 10 is a port number of a server constructed by the mobile terminal 10. The mobile terminal 10 includes the port number in the URL information 5000, as described later. The port number is set by an administrator or the like of the image forming apparatus 20 taking into account a port number, passing of which is allowed at the firewall. Therefore, because the image forming apparatus 20 accesses the mobile terminal 10 going through a limited port, decrease in security can be suppressed.

Although not illustrated in TABLE 2, the second communication information 1300 may include a category of the apparatus (an MFP, a projector, an electronic whiteboard or the like), PDL (Printer Description Language) supported by the image forming apparatus 20, a time limit for connection of the network N2, or the like. According to the category of the apparatus, the mobile terminal 10 can determine which service can be acquired. According to the PDL supported by the image forming apparatus 20, it is possible to determine whether the mobile terminal 10 can prepare image data of the PDL that the image forming apparatus 20 can interpret. The time limit for connection of the network N2 represents a time period when the second communication information 1300 is valid. When the time period has elapsed, the mobile terminal 10 deletes the second communication information 1300 or cannot use the second communication information 1300. Therefore, a time period when the mobile terminal 10 can communicate with the image forming apparatus 20 via the network N2 is controlled, decrease in security can be suppressed.

For example, when the mobile terminal 10 and the image forming apparatus 20 are configured so as to be further connectable via the network N3, the second communication information 1300 may include third communication information 1500 for communicating with the image forming apparatus 20 via the network N3.

Information as described above included in the company AP communication information 1100 and the second communication information 1300 is an example. The company AP communication information 1100 and the second communication information 1300 may include various pieces of information required for performing communication via the network N1 and the network N2, respectively.

Moreover, neither the company AP communication information 1100 nor the second communication information 1300 includes IP address 3000 of the image forming apparatus 20. The IP address 3000 of the image forming apparatus 20 is acquired by the mobile terminal 10 when the image forming apparatus 20 is connected to the server constructed by the mobile terminal 10.

(Function of Mobile Terminal)

The short-range communication unit 11 is enabled by the CPU 106, the short-range wireless communication device 109, and the like, illustrated in FIG. 3, and performs wireless communication with the image forming apparatus 20 existing within a distance of a few meters. Main information received by the short-range communication unit 11 is the second communication information 1300, and main information sent by the short-range communication unit 11 is the URL information 5000, as described later.

The short-range communication unit 11 performs communication according to the communication standard of Bluetooth Low Energy, as described above. Because the procedure of communication is known, detailed explanation of the procedure will be omitted, but a brief explanation will be made later. In the embodiment, the mobile terminal 10 corresponds to a central node (service using side), and the image forming apparatus 20 corresponds to a peripheral node (service offering side).

The server construction unit 12 is enabled by the CPU 106 or the like illustrated in FIG. 3, and constructs a server in the mobile terminal 10. The constructed server is the server unit 12a. Constructing a server refers to preparing a response dealing with a request for HTTP (or HTTPS). Functions of the server unit 12a will be described with reference to FIG. 7 later. Generally, the mobile terminal 10 cannot be accessed externally (by the image forming apparatus 20 of the like) for a security reason. However, by preparing the server unit 12a, communication with the mobile terminal 10 from outside becomes possible by the HTTP communication or the like.

Moreover, the server construction unit 12 prepares URL information 5000 that accepts communication to the constructed server unit 12a. The URL information 5000 includes information for generating URL of the server unit 12a by the image forming apparatus 20. A method of preparing the URL information 5000 will be described later with reference to FIG. 6. The URL information 5000 is sent to the image forming apparatus 20 by the short-range communication unit 11.

The connection propriety determination unit 13 is enabled by the CPU 106 or the like illustrated in FIG. 3, and determines whether the mobile terminal 10 can be coupled to the network N1 or the network N2 based on whether communication is accepted by the URL of the server unit 12a generated by the image forming apparatus 20 by using the URL information 5000. When the mobile terminal 10 can be coupled to the network N1 or the network N2, the mobile terminal 10 can communicate with the image forming apparatus 20. Then, the connection propriety determination unit 13 can be referred to determining whether the mobile terminal 10 can communicate with the image forming apparatus 20.

Communication to the server unit 12a by the URL prepared by using the URL information 5000 is communication for acquiring the IP address 3000 of the image forming apparatus 20 by the mobile terminal 10, and performed by a request for the HTTP communication.

When the connection propriety determination unit 13 determines that the network N1 cannot be connected to, a network switching unit 14 switches the connection destination of the mobile terminal 10 from the network N1 (or other network to which the mobile terminal 10 is coupled) to the network N2. Specifically, the second communication unit 162, to which the second communication information 1300 is applied, is prepared (setting the second communication information 1300 to the second the second communication unit 162). However, depending on the OS of the mobile terminal 10, user's permission or operation is required for the switching of networks. In addition, the mobile terminal 10 may be disconnected from any networks. In this case, the mobile terminal 10 only has to be coupled to the network N2.

The UI display unit 15 is enabled by the CPU 106, the display device 102, and the like, illustrated in FIG. 3, generates various screens displayed on the display device 102, and displays the screens. Moreover, the UI display unit 15 displays a message for urging the user to operate as necessary.

The operation acceptance unit 17 is enabled by the CPU 106, the input unit 101, and the like, illustrated in FIG. 3, and accepts various operations for the mobile terminal 10 by the user.

The communication unit 16 is enabled by the CPU 106 and the communication interface 107 and the like, illustrated in FIG. 3, and sends/receives variety of data to/from the image forming apparatus 20. More specifically, when the user is an employee 8, the company AP communication information 1100 is set to the first communication unit 161. The first communication unit 161 is coupled to the network N1, and communicates with the image forming apparatus 20 via the network N1. Moreover, when the connection propriety determination unit 13 determines that the first communication unit 161 cannot be coupled to the network N1, the second communication unit 162, to which the second communication information 1300 is set, is prepared. The second communication unit 162 is coupled to the network N2, and communicates with the image forming apparatus 20 via the network N2.

The job control unit 18 is enabled by the CPU 106 or the like, illustrated in FIG. 3, and performs a process for requesting a job such as printing from the image forming apparatus 20

The storage/readout unit 19 is enabled by the CPU 106, the SSD 108, the RAM 104, the ROM 105, and the like, illustrated in FIG. 3, and reads out various data from the storage unit 1000 or writes various data into the storage unit 1000. In the following, even when the mobile terminal 10 accesses the storage unit 1000, description of "via the storage/readout unit 19" may be omitted.

<<Image Forming Apparatus>>

The image forming apparatus 20 of the print system 1 includes a short-range communication unit 25, a print function unit 27, a communication unit 26, a storage/readout unit 29, and the like. Moreover, the communication unit 26 includes a third communication unit 261, a fourth communication unit 262, and the like. The respective function units are functions or means enabled by the CPU 211 executing the program 215*a* stored in the HDD 215 to control any of the respective elements, with which the image forming apparatus 20 is provided. A part of or all of the respective function units may be enabled by hardware (IC or the like).

Moreover, the image forming apparatus 20 has a storage unit 2000 enabled by the RAM 212, the NVRAM 214, the HDD 215, the ROM 213, or the like. The storage unit 2000 includes the second communication information 1300. The second communication information 1300 of the image forming apparatus 20 is the same as the second communication information 1300 of the mobile terminal 10. Moreover, the storage unit 2000 may include the company AP communication information 1100, but when the image forming apparatus 20 is coupled to the network N1 by wire, the company AP communication information 1100 is unnecessary. When the image forming apparatus 20 is coupled to the network N1 wirelessly, the storage unit 2000 stores the company AP communication information 1100, and the company AP communication information 1100 is set to the third communication unit 261.

(Function of Image Forming Apparatus)

The short-range communication unit 25 is enabled by the CPU 211, the short-range wireless communication device 206, and the like, illustrated in FIG. 4, and performs wireless communication with the mobile terminal 10 existing within a distance of about a few meters. Main information received by the short-range communication unit 25 is the URL information 5000, and main information sent by the short-range communication unit 25 is the second communication information 1300.

The print function unit 27 is enabled by the printer 205 or the like, illustrated in FIG. 4, and prints print object data included in a print job, execution of which is required by the mobile terminal 10. The image forming apparatus 20 may include, in addition to the print function unit 27, a scan function unit for generating image data (electronic data) from a read-out document, a copying function unit for replicating the read-out document, a facsimile function unit for facsimile transmitting the read-out document or the electronic data via the telephone network, or the like.

The communication unit 26 is enabled by the CPU 211, the communication interface 204, and the like, illustrated in FIG. 4, and sends/receives various data to/from the mobile terminal 10. More specifically, when the short-range communication unit 25 receives the URL information 5000, the third communication unit 261 tries to communicate with the server unit 12*a* of the mobile terminal 10 via the network N1. Moreover, when the URL information 5000 is acquired again (i.e. the URL information 5000 for the next is acquired), the fourth communication unit 262 is coupled to the network N2, and tries to communicate with the server unit 12*a* of the mobile terminal 10 via the network N2. To the fourth communication unit 262, the second communication information 1300 is set in advance. Alternatively, by receiving the URL information 5000 again (i.e. receiving the URL information 5000 for the next), the communication unit 26 may prepare the fourth communication unit 262 to which the second communication information 1300 is set.

The storage/readout unit 29 is enabled by the CPU 211, the RAM 212, the ROM 213, the NVRAM 214, the HDD 215 and the like, illustrated in FIG. 4, reads out various data from the storage unit 2000, and writes various data into the storage unit 2000. In the following, even when the image forming apparatus 20 accesses the storage unit, the description "via the storage/readout unit 29" may be omitted.

<URL Information 5000>

With reference to FIG. 6, the URL information 5000 will be described. FIG. 6 is a diagram depicting an example for explaining the URL information and the URL. The URL information 5000 prepared by the server construction unit 12 of the mobile terminal 10 includes three pieces of information, i.e. (1) the IP address of the mobile terminal 10, (2) the port number, and (3) a one-time password.

(1) The IP address of the mobile terminal is an IP address fixed to the mobile terminal 10 or given by the DHCP server. The IP address can be detected by a command such as "ipconfig", and is known for the mobile terminal 10.

(2) The port number is a "port number of the server of the mobile terminal" in the second communication information 1300 sent from the image forming apparatus 20. The port number is a port number for waiting for communication from the image forming apparatus 20 by the mobile terminal 10.

(3) The one-time password is information for authenticating the image forming apparatus 20 by the mobile terminal 10, and is changed each time the server construction unit 12 prepares the URL information 5000. The one-time password is, for example, an arbitrary and random combination of alphanumeric characters. That is, an image forming apparatus 20 that specifies the one-time password to connect to the mobile terminal 10 can be authenticated to be the image forming apparatus 20, to which the mobile terminal 10 sends the URL information 5000.

In this way, according to the URL information 5000, the information required for the image forming apparatus 20 to communicate with the server unit 12*a* of the mobile terminal 10, such as an IP address or a port number, can be obtained. As illustrated in FIG. 6, the third communication unit 261 or the fourth communication unit 262 of the image forming apparatus 20 prepares URL using the URL information 5000 according to the specification for the HTTP communication. Then, the third communication unit 261 or the fourth communication unit 262 of the image forming apparatus 20 can communicate with the server unit 12*a* constructed in the mobile terminal 10. The server construction unit 12 of the mobile terminal 10 may send the URL itself instead of the URL information 5000 to the image forming apparatus 20.

Because the URL is address information for the image forming apparatus 20 to communicate with the server unit 12*a*, when the server unit 12*a* and the image forming apparatus 20 communicate with each other, the mobile terminal 10 can determine that the image forming apparatus 20 performs communication using the URL information 5000.

The URL information 5000 is sent from the mobile terminal 10 to the image forming apparatus 20 for the network N1 and the network N2, respectively (each time the network is switched). The IP address depends on the address fixed to the mobile terminal 10 or given by the DHCP server, and the port number depends on the "port number of the server of the mobile terminal" sent by the image forming apparatus 20. Therefore, the URL information 5000 may be unchanged except for the one-time password. The URL information 5000 is sent each time the network is switched, because the IP address of the URL information 5000 can change due to the switch of the network. Furthermore, the URL information 5000 is sent each time the network is switched in order to give a momentum to start the communication with the server unit 12*a* by the image forming apparatus 20, and in order to send a one-time password.

In addition, the part of the IP address of the mobile terminal 10 of the URL information may be send by a hostname instead of the IP address. In this case, the server construction unit 12 registers the IP address (URL except for the port number) of the mobile terminal 10 and the hostname in association with each other in the DNS (Domain Name System) server.

<Function of Server Unit 12*a*>

First, a server refers to a service provision unit (computer or apparatus) that provides, to another computer on a network, a function, a service, data or the like that the service provision unit owns. The service provision unit is specifically called a server or a server apparatus. The server unit 12*a* according to the embodiment also operates as the server of the above-described meaning. However, the server unit 12*a* has a function of detecting whether the image forming apparatus 20 can connect to the mobile terminal 10, and a function of acquiring address information of the image forming apparatus 20. The address information of the image forming apparatus 20 is information for uniquely identifying the image forming apparatus 20 on the network N1 or the network N2. Specifically, the address information includes the URI, URL, hostname, IP address or the like of the image forming apparatus 20. In the embodiment, the IP address 3000 will be described as an example.

FIG. 7 is a sequence diagram depicting an example for explaining the function of the server unit 12*a*. FIG. 7 illustrates processes after the URL information 5000 is sent.

The image forming apparatus 20 accesses the mobile terminal 10 requesting the HTTP communication (step S71). The image forming apparatus 20 can access the mobile terminal because of the server unit 12*a* in the mobile terminal 10.

The server unit 12*a* acquires a password sent by the above-described URL, and determines whether the acquired password coincides with a password included in the URL information 5000 (step S72).

When the passwords coincide with each other, the server unit 12*a* sends communication OK (status code 200) to the image forming apparatus 20 via the first communication unit 161 or the second communication unit 162 (step S73). The communication OK (status code 200) indicates that the communication is successful.

When the passwords do not coincide with each other, the server unit 12*a* sends communication NG (status code 401) to the image forming apparatus 20 via the first communication unit 161 or the second communication unit 162 (step S74). The communication NG (status code 401) indicates that the authentication is not successful (unauthorized). The status code 401 may be other status code in the 400*s*.

The image forming apparatus 20 sends the request for HTTP communication repeatedly to the server unit 12*a* (step S75), because the image forming apparatus 20 cannot determine whether the request at step S71 reached the server unit 12*a* in the case other than the communication OK. The constructed server unit 12*a* returns the communication OK only for the first request after construction, and returns the communication NG (status code 404) for the second or later request (step S77) even if the passwords coincide with each other (step S76). The status code 404 indicates that the requested resource is not found. For the second or later request, other response in the 400*s* may be prepared.

According to the communication NG returned for the second or later request, even when the mobile terminal 10 receives a request from a device other than the image forming apparatus 20, mistaking the device for the image forming apparatus 20 can be suppressed.

Moreover, the server unit 12*a* reports to the connection propriety determination unit 13 that the server unit 12*a* receives a request from the image forming apparatus 20 (step S711). Then, the connection propriety determination unit 13 can determine that the mobile terminal 10 can be coupled to the network N1 or the network N2 (communicate with the image forming apparatus 20).

Moreover, the server unit 12*a* acquires the IP address 3000 of the image forming apparatus 20 and reports the IP address to the job control unit 18 (step S712). By the first communication unit 161 or the second communication unit 162 receiving the request, the IP address 3000 of the image forming apparatus 20 included in an IP header sent/received in the TCP/IP layer can be acquired.

In this way, by preparing the server unit 12*a*, even if the mobile terminal 10 does not acquire the IP address 3000 from the image forming apparatus 20 by Bluetooth Low Energy or the like, determination of connection propriety, acquisition of the IP address 3000 of the image forming apparatus 20, or the like becomes possible.

<Regarding Bluetooth Low Energy>

In Bluetooth Low Energy (in the following, referred to as BLE), the mobile terminal 10 and the image forming apparatus 20 communicate with each other one-to-one. For the mobile terminal 10 and the image forming apparatus 20 roles are defined, respectively. A device that offers service (in the embodiment, the image forming apparatus 20) will be referred to as peripheral node, and a device that uses service (in the embodiment, the mobile terminal 10) will be referred to as central node. Their relation is not fixed, and may be inverted.

The peripheral node and the central node communicate following a list of data that the peripheral node has. To a datum a UUID (Universally Unique Identifier) and a HANDLE (Attribute Handle) are given. The central node specifies either of the two and accesses the peripheral node. Moreover, in Bluetooth Low Energy, this datum is referred to as characteristic.

The peripheral node sends an advertise packet of the UUID indicating service content at regular intervals. When the central node enters a region where an electric wave reaches, the central node receives the advertise packet. When the central node determines that the service is an objective service, the central node acquires a method or the like for accessing the data by acquiring the data list from the peripheral node.

When the central node determines to perform communication because the service is an objective service, the central node declares a start of communication. Afterwards, communication for confirming mutual existence is performed at regular intervals until an end of communication is declared.

Transmission/reception of data is performed by specifying the UUID or the HANDLE (specifying the characteristic). For example, when the central node acquires data from the peripheral node, "Read Characteristic" is used, and when the central node sends data to the peripheral node, "Write Characteristic" is used.

<Details of Process>

Next, details of process of the print system 1 will be described.

<<Whole Operation>>

First, with reference to FIG. 8, a flow of the print process of the print system 1 according to the first example will be described. FIG. 8 is a sequence diagram depicting an example of the print process according to the first example. Moreover, FIGS. 9A to 10B are diagrams depicting examples of a screen displayed on the mobile terminal 10, and will be referred appropriately for explanation.

The user operates the screen displayed by the UI display unit 15 of the mobile terminal 10 to instruct execution of printing (step S81). The user select desired print object data from the application installed in the mobile terminal 10 and instructs to execute printing. Then, a print job including print object data selected by the user is generated. By executing printing, the screen illustrated in FIG. 9A is displayed on the display device 102 of the mobile terminal 10.

FIG. 9A is a diagram depicting an example of a print condition screen 901. In the print condition screen 901, the print object data 902, an icon 903 of the image forming apparatus 20, a number of printed copies 904, color/monochrome 905 and a size of sheet of paper 906 are displayed. In the number of printed copies 904, the color/monochrome 905 and the size of sheet of paper 906, initial configuration values, which are set in advance in the application, are displayed, and configuration values that the user finally set are retained. Therefore, when the user causes the image forming apparatus 20 to perform printing using the mobile terminal 10, the user can minimizes change in setting and to perform printing with the user's desired configuration value (printing condition).

The usage method advice 907 includes, for example, an icon 907*a* or a message 907*b* of "Touch MFP to start printing", and urges the user to bring the mobile terminal 10 close to a position of the short-range wireless communication device 206 of the image forming apparatus 20. By bringing the mobile terminal 10 close to the position, the short-range communication unit 11 of the mobile terminal 10 acquires the second communication information 1300 from the short-range wireless communication device 206 of the image forming apparatus 20.

The user brings the mobile terminal 10 close to the short-range wireless communication device 206 of the image forming apparatus 20 following an instruction of the screen (step S82). As BLE, the devices can perform communication with each other within a distance of about a few meters. However, because there is also a case where the plurality of image forming apparatuses 20 are arranged near the user, the mobile terminal 10 detects that the user intentionally brings the mobile terminal 10 close to the image forming apparatus 20 within a predetermined distance. Specifically, the short-range communication unit 11 of the mobile terminal 10 detects that the mobile terminal 10 is brought close to the image forming apparatus 20 at a distance less than about 10 to 50 cm. The predetermined distance may be settable by the user.

The detection of distance will be explained. As described above, the image forming apparatus 20 sends the advertise packet to the range where BLE can communicate (a few meters). The advertise packet includes an output of the short-range wireless communication device 206. Moreover, the short-range wireless communication device 109 detects strength of electric wave when receiving an electric wave of the BLE. The short-range communication unit 11 of the mobile terminal 10 converts a difference or a ratio of the output and the electric wave strength into a distance according to a predetermined conversion formula or a table. Then, the short-distance communication unit 11 of the mobile terminal 10 can detect a distance to the image forming apparatus 20.

The short-distance communication unit 11 may start the communication with the image forming apparatus 20 without determining whether the distance is less than the predetermined value.

The short-distance communication unit 11 of the mobile terminal 10 starts reception of an electric wave by approaching the image forming apparatus 20 within about a few meters. The short-distance communication unit 11 repeats detection of the distance to the image forming apparatus 20 until approaching within a predetermined distance (step S821).

When the short-distance communication unit 11 of the mobile terminal 10 determines that the mobile terminal 10 approaches the image forming apparatus 20 within the predetermined distance, the short-range communication unit 11 starts communication with the image forming apparatus 20 (declares the communication start). Then, the short-distance communication unit 11 of the mobile terminal 10 is coupled to the network BLE (step S822).

Next, the short-distance communication unit 11 of the mobile terminal 10 acquires the second communication information 1300 of the image forming apparatus 20 via the network BLE (step S823). Specifically, by specifying the characteristic requiring the second communication information 1300, the short-distance communication unit 11 acquires the second communication information 1300. The short-distance communication unit 25 of the image forming apparatus 20 acquires the request for the second communication information 1300, reads out the second communication information 1300 from the storage unit 2000, and sends it to the mobile terminal 10. The short-distance communication unit 11 of the mobile terminal 10 stores the second communication information 1300 into the storage unit 2000.

Processes in the later steps S824 to S851 are executed for determination whether the mobile terminal 10 is coupled to the network N1, and determination whether the mobile terminal 10 is coupled to the network N2, respectively (i.e. repeated by the number of networks). However, when the mobile terminal 10 is determined to be coupled to the network N1, the determination whether the mobile terminal 10 is coupled to the network N2 is not performed.

The network switching unit 14 switches the network, to which the mobile terminal 10 is coupled, from the network N1 (or other network, to which the mobile terminal 10 is coupled) to the network N2 (step S824). This process is preformed when the mobile terminal 10 is determined not to be coupled to the network N1. Details of the process will be described later.

When connected to the network BLE, the server construction unit 12 of the mobile terminal 10 constructs the server unit 12*a* (step S825). Moreover, the server construction unit 12 prepares the URL information 5000 using the second communication information 1300 that is read out from the storage unit 1000. The IP address of the mobile terminal 10 is known, and the port number is described in the second communication information 1300. Then, the one-time password can be prepared arbitrarily.

The short-range communication unit 11 of the mobile terminal 10 sends the URL information 5000 to the image forming apparatus 20 via the network BLE (step S826). Specifically, the short-range communication unit 11 sends the URL information 5000, by specifying characteristics for sending the URL information 5000 and attaching the URL information 5000. The short-range communication unit 11 preferably encrypts the URL information 5000. For the encryption, a fixed value that is preliminarily set in the program 108*a* of the mobile terminal 10 and the in the program 215*a* of the image forming apparatus may be used. Otherwise, the information for the encryption may be exchanged when the communication of BLE starts at step S822.

When the short-distance communication unit 25 of the image forming apparatus 20 acquires a characteristic that does not exist in the image forming apparatus 20 (is not present in the above-described list), an error is detected, and later processes are not performed.

When the mobile terminal 10 sends the URL information 5000, a connecting screen 911, illustrated in FIG. 9B is displayed on the display device 102 of the mobile terminal 10. In the connecting screen 911, an indication of connecting is displayed by an icon 912, characters 913 and the like. Moreover, a cancel button 914 for aborting the connection or the print job by the user is displayed.

When the short-distance communication unit 25 of the image forming apparatus 20 acquires the URL information 5000, the short-short distance communication unit 25 decrypts the URL information 5000, and reports it to the third communication unit 261 (step S8261).

The third communication unit 261 of the image forming apparatus 20 prepares a URL by using the URL information 5000, as illustrated in FIG. 6. At a timing of acquiring the URL information 5000, the third communication unit 261 tries to communicate with the server unit 12a of the mobile terminal 10 via the network N1 (step S82611). The third communication unit 261 of the image forming apparatus 20 is assumed to have been coupled to the network N1. Moreover, the fourth communication unit 262 of the image forming apparatus 20 is assumed to have been coupled to the network N2, or even when being not coupled to the network N2, the fourth communication unit is assumed to have no problem connecting to the network N2.

The connection propriety determination unit 13 waits for a request for HTTP communication to the server unit 12a from the image forming apparatus 20, for a waiting time since the short-distance communication unit 11 sends the URL information 5000. The waiting time is, for example, a few seconds, but is not limited to this. The waiting time can be preferably set by the user from the screen. The third communication unit 261 of the image forming apparatus 20 specifies the IP address of the server unit 12a and the port number by the URL, to send a request for HTTP communication (step S83). The request includes a one-time password. The request for HTTP communication includes various methods, and, for example, POST, GET or the like is used. In the embodiment, any method can be used. This is because the request for HTTP communication is performed in order to report the IP address 3000 of the image forming apparatus 20 to the mobile terminal 10 by the image forming apparatus 20. Because the IP protocol only has to be used in order to report the IP address 3000, the communication protocol, which is higher than the IP protocol, is not limited to the HTTP communication. For example, HTTPs, HTTP/2, FTP (File Transfer Protocol), or the like may be used. Moreover, instead of TCP, UDP may be used.

When the third communication unit 261 of the image forming apparatus 20 sends the request for HTTP communication, the first communication unit 161 of the mobile terminal 10 accepts the request, and reports the request to the server unit 12a. As described above, when one-time passwords coincide with each other, the server unit 12a returns a response of status code 200 to the first request after the URL information 5000 is sent, and returns a response of status code 404 to the second or later request. This is because the image forming apparatus 20 cannot determine whether the mobile terminal 10 receives the request when the status code is not 200, and the request at step S75 illustrated in FIG. 7 is sent repeatedly.

The server unit 12a of the mobile terminal 10 receives the request and reports the request reception to the connection propriety determination unit 13, and thereby the connection propriety determination unit 13 determines that the mobile terminal 10 can be coupled to the network N1. Moreover, the mobile terminal 10 can acquire the IP address 3000 of the image forming apparatus 20 (step S831).

Because the IP address 3000 can be acquired, the server 12a becomes unnecessary. Then, the server construction unit 12 removes the server unit 12a (step S84).

Moreover, because the transmission of the request from the image forming apparatus 20 becomes unnecessary by acquiring the IP address 3000, the short-range communication unit 11 of the mobile terminal 10 sends an end report for request to the image forming apparatus 20 (step S85). Specifically, the short-range communication unit 11 writes a predetermined value (zero) into characteristic reporting the end of request.

The short-range communication unit 25 of the image forming apparatus 20 acquires the end report of request, and causes the third communication unit 261 to end sending the request (step S851).

The short-range communication unit 11 of the mobile terminal 10 ends the communication of BLE, i.e. declares an end of communication (step S86). Then, the mobile terminal 10 is disconnected from the network BLE.

After step S86, a process by the mobile terminal 10 for requiring the image forming apparatus 20 to execute a job is performed.

Because the mobile terminal 10 acquires the IP address 3000 of the image forming apparatus 20, the first communication unit 161 or the second communication unit 162 of the mobile terminal 10 requests the image forming apparatus 20 for a print job via the network N1 or the network N2 (step S87). Therefore, the mobile terminal 10 can communicate with the image forming apparatus 20 with a communication protocol such as HTTP.

When the process at step S87 is performed, a screen illustrated in FIG. 10A is displayed. FIG. 10A illustrates a transmission completion screen 921 displayed on the display device 102 of the mobile terminal 10. The transmission completion screen 921 is a screen indicating that transmission of a print job from the mobile terminal 10 to the image forming apparatus 20 is completed. In the transmission completion screen 921, a message 922 of "transmission completed" and an icon 923 indicating the completion of the transmission are displayed. The transmission completion screen 921 is cleared automatically after displayed for a predetermined time, and a print condition screen 901, illustrated in FIG. 9A, is displayed. The print condition screen 901 may be displayed by depressing (touching) the icon 923 by the user or the like.

Moreover, when the mobile terminal 10 cannot be connected to any of the networks N1 and N2, the UI display unit 15 of the mobile terminal 10 displays a screen illustrated in FIG. 10B. FIG. 10B depicts an example of a non-connectable screen 931 displayed on the display device 102 of the mobile terminal 10. In the non-connectable screen 931, a message 932 of "cannot be connected to device" and an OK button 933 are displayed. When the user depresses (touches) the OK button 933, the print condition screen 901 illustrated in FIG. 9A is displayed on the display device 102.

The third communication unit 261 of the fourth communication unit 262 of the image forming apparatus 20 receives the request for the print job via the network N1 or N2, and reports the print job to the print function unit 27 (step S871).

The job control unit 18 of the image forming apparatus 20 executes the print job (step S872). When the execution of the print job ends, the job control unit 18 sends a completion report of the print job to the third communication unit 261.

The third communication unit 261 sends the completion report of the print job to the mobile terminal 10. The image forming apparatus 20 may send the completion report to the image forming apparatus 20 by using the URL information 5000. In this case, the server unit 12a is removed after completion of the execution of the job. The image forming apparatus may send the completion report as a response to the HTTP communication at step S87.

As described above, the mobile terminal 10 can send the URL information 5000 to the image forming apparatus 20, and receive a report of the IP address 3000 from the image forming apparatus 20. Therefore, the print system 1 can execute the print job.

<Switching from Network N1 to Network N2>

The switching of network at step S824 in FIG. 8 will be described. Methods of switching networks are different depending on the OS of the mobile terminal 10. As an example of the OS, Android (trademark registered, in the following will be omitted) and iOS (trademark registered, in the following will be omitted) will be explained.

When the mobile terminal 10 does not receive a request during the waiting time at step S83 in FIG. 8, the connection propriety determination unit 13 determines that the mobile terminal 10 cannot be connected to the network N1, and the communication unit 16 switches the network to be connected from the network N1 to the network N2.

<<Android>>

The program 108a operating on Android can switch networks. That is, Android is an OS that does not monitor the switching of networks. In this case, a network switching unit 14 is generated in the second communication unit 162 to which the second communication information 1300 is set, and validates the second communication unit 162 instead of the first communication unit 161. After the validation of the second communication unit 162, the processes at steps S825 to S851 are performed.

<<iOS>> iOS monitors whether the program 108a tries to switch networks. Therefore, even when the network switching unit 14 tries to generate the second communication unit 162, to which the second communication information 1300 is set, or stop the first communication unit 161, iOS does not permit it. For switching of the network, an operation by the user is necessary.

FIG. 11 depicts an example of a network switching screen 941 displayed on the display device 102 of the mobile terminal 10. For example, when the connection propriety determination unit 13 determines that the mobile terminal 10 cannot be connected to the network N1, the UI display unit 15 of the mobile terminal 10 displays the network switching screen 941, illustrated in FIG. 11, before determining the communication via the network N2. In this way, the user is urged to switch the network, instead of switching by the network switching unit 14.

In the network switching screen 941, a message 942 of "please switch network" and an OK button 943 are displayed. The message 942 indicates that the user is urged to switch the network. The network switching screen 941 is cleared automatically after displayed for a predetermined time, and the print condition screen 901, illustrated in FIG. 9A, is displayed. By depressing (touching) the OK button 943 by the user, the print condition screen 901 may be displayed, or a screen for switching networks prepared by iOS may be displayed.

At the timing when the user depresses the OK button 943 or at the timing when the mobile terminal 10 acquires the second communication information 1300, the network switching unit 14 prepares a profile for setting the second communication information 1300 to the second communication unit 162. The profile is a file in which the second communication information 1300 is described in the format specified by iOS. The user can switch from the network N1 to N2, by selecting the profile as a new wireless communication parameter in the screen for switching networks provided by iOS. After switching the network, the processes at steps S825 to S851 are performed.

<<Timing for Acquiring Second Communication Information>>

As can be seen from the explanation for the switching of networks, the second communication information 1300 becomes necessary when it is determined that the mobile terminal 10 cannot be connected to the network N1. Therefore, the mobile terminal 10 may acquire the second communication information 1300 after determining that the mobile terminal 10 cannot be connected to the network N1 at step S83 in FIG. 8, in addition to the receiving at step S823. In this case, because the "port number of server for mobile terminal" of a server included in the URL information 5000 and acquired from the second communication information 1300 is not received, only the port number of the server is received at step S823, the mobile terminal 10 prepares the URL information 5000 with an arbitrary port number, or the like can be considered. Even for the latter case, when the port is not closed by a firewall or the like, there is almost no disadvantage.

<<Timing for Sending Print Job>>

Because the mobile terminal 10 can acquire the IP address 3000 at step S83 or S831 in FIG. 8, when the process is after the step S83 or S831, the mobile terminal 10 can send the print job to the image forming apparatus 20. The reason why the print process is described by the procedure illustrated in FIG. 8 is that the present image forming apparatus 20 is not designed to execute the print job in the processes from the reception of the URL information to the transmission of the request. However, because the image forming apparatus 20 can acquire the print job also by the response to the transmission of the request or the like, the mobile terminal 10 may send the print job after step S831. In this case, there is an effect that time to start the print job can be reduced.

<<Process from Construction of Server to Acceptance of Request>>

With reference to FIG. 12, the process from the construction of the server to the acceptance of the request, illustrated in FIG. 8, will be described in detail. FIG. 12 is a flowchart depicting an example for explaining in detail the process that the mobile terminal 10 constructs the server unit 12a and accepts the request. The process illustrated in FIG. 12 is executed after step S823 in FIG. 8 (when the network cannot be switched), or after step S824 (when the network is switched). That is, the same process is executed in the network N1 and in the network N2, respectively (when the network can be switched to the network N2).

First, the server construction unit 12 of the mobile terminal 10 constructs the server unit 12a (step S10). Then, the server unit 12a is formed, and the mobile terminal 10 is ready to accept the request for HTTP communication from the image forming apparatus 20.

The server construction unit 12 determines whether the server unit 12a is constructed (step S20). A case where the server construction unit 12 cannot construct the server unit 12a (step S20: NO) is a case where, for example, the port number of the server unit 12a is used by other application. That is, the port number of the server unit 12a is the same as a port number included in the URL information 5000, but is originally the "port number of server for mobile terminal" included in the second communication information 1300. Therefore, depending on the mobile terminal 10, other application may use the same port number. The server construction unit 12 determines whether the port number is used, by querying the OS whether the port number is used or the like. Other cases where the server cannot be constructed includes, for example, a case where the memory capacity is insufficient, and a case where the construction of the server is prohibited for security.

When the construction of the server unit 12a is successful (step S20: YES), the short-range communication unit 11 of the mobile terminal 10 sends the URL information 5000 of the server unit 12a to the image forming apparatus 20 via the network BLE (step S30). On the display device 102 of the mobile terminal 10, the connecting screen 911, illustrated in FIG. 9B, is displayed.

Then, the short-range communication unit 11 determines whether the URL information 5000 can be sent to the image forming apparatus 20 (step S40). A case where the URL information 5000 cannot be sent (step S40: NO) is, for example, a case where the mobile terminal deviates from the region where an electric wave of BLE of the image forming apparatus 20 reaches, electric waves are congested, or the like.

When the URL information 5000 can be sent (step S40: YES), the connection propriety determination unit 13 waits for a request for HTTP communication from the image forming apparatus 20 to the server unit 12a (step S50).

When the first communication unit 161 or the second communication unit 162 receives the request for HTTP communication during the waiting period (step S60: YES), the server unit 12a acquires the IP address 3000 of the image forming apparatus 20 from the IP header (step S70).

A case where the first communication unit 161 or the second communication unit 162 does not receive the request for HTTP communication during the waiting period (step S60: NO) is a case where the mobile terminal 10 is not coupled to the network N1 or N2, i.e. the mobile terminal 10 cannot communicate with the image forming apparatus 20.

Moreover, when the construction of the server is determined to be unsuccessful (step S20: NO), the server construction unit 12 detects an error. When the URL information 5000 is determined not to be sent to the image forming apparatus (step S40: NO), the short-range communication unit 11 detects an error. When the first communication unit 161 or the second communication unit 162 does not receive the request for HTTP communication during the waiting period (step S60: NO), the connection propriety determination unit 13 detects an error (step S80). In the above-described cases, the UI display unit 15 of the mobile terminal 10 displays the non-connectable screen 931, as illustrated in FIG. 10B.

<<Procedure of Connection to Network>>

With reference to FIG. 13, the determination of the connection propriety to the network N1 or N2 illustrated in FIG. 8 will be explained in detail. FIG. 13 is a flowchart depicting an example for explaining the process of determining whether the mobile terminal 10 can be coupled to the network N1 or N2 in detail. The process illustrated in FIG. 13 is executed subsequently to the process at step S825 in FIG. 8. Moreover, the process illustrated in FIG. 13 includes connection determination to the network N1 and connection determination to the network N2.

First, as described with reference to FIG. 12, the mobile terminal 10 constructs the server unit 12a with which the image forming apparatus 20 communicates with the mobile terminal 10 via the network N1 (step S110). Moreover, the mobile terminal 10 sends the URL information 5000 to the image forming apparatus 20.

When the URL information 5000 is sent, the connection propriety determination unit 13 determines whether the request for HTTP communication is acquired from the image forming apparatus 20 (step S120). Assuming that the third communication unit 261 of the image forming apparatus 20 is coupled to the network N1, and the fourth communication unit 262 of the image forming apparatus is coupled to the network N1, use cases will be explained separately.

<<First Use Case>>

The mobile terminal 10 of the guest 9 may be disconnected from networks, or may have been connected to any of the networks (other than the networks N1, N2, and BLE). The third communication unit 261 of the image forming apparatus 20 communicates with the server unit 12a of the mobile terminal 10 with the URL generated by the URL information 5000 (sends a request for HTTP communication). Because the mobile terminal 10 of the guest 9 is not coupled to the network N1, the first communication unit 161 of the mobile terminal 10 does not receive the request. Therefore, in the first use case, the mobile terminal 10 is determined not to acquire the request (step S120: NO).

The fourth communication unit 262 of the image forming apparatus 20 may communicate with the server unit 12a of the mobile terminal 10 with the URL generated by the URL information 5000 in parallel with the third communication unit 261 or alternately. Even when the image forming apparatus 20 operates in this way, the first communication unit 161 or the second communication unit 162 of the mobile terminal 10 does not receive the request, because the mobile terminal 10 is not coupled to the network N2.

Which communication unit of the third communication unit 261 and the fourth communication unit 262 the image forming apparatus 20 uses for performing communication is determined by a routing table of the image forming apparatus 20 and the IP address of the mobile terminal 10 included in the URL information 5000. The communication unit 26 refers to the routing table. When the rule in the routing table specifies the communication by the third communication unit 261 for the IP address of the mobile terminal 10, the third communication unit 261 is used for communication. When the fourth communication unit 262 is specified for communication, the fourth communication unit 262 is used.

<<Second Use Case>>

When the mobile terminal 10 of the employee 8 is coupled to the company LAN (network N1), the third communication unit 261 of the image forming apparatus 20 is often considered to be able to communicate with the server unit 12a of the mobile terminal 10 using the URL generated by the URL information 5000. However, even when the mobile terminal 10 is coupled to the network N1, the following situation can be considered.

When a device having the same IP address as the URL of the URL information 5000 is present in the network N1 (There may be the same case for the image forming apparatus 20), communication with the mobile terminal 10 may be unstable, even if the communication with the mobile terminal 10 is possible. However, even in this case, if the mobile terminal 10 can receive the request even once, the IP address 3000 of the image forming apparatus 20 can be acquired. Therefore, there is no problem. When the image forming apparatus 20 cannot communicate with the mobile terminal 10 at all, the process is the same as in the first use case.

Moreover, even if the user is the employee 8, when the mobile terminal 10 is not coupled to the company LAN, the image forming apparatus 20 cannot communicate with the mobile terminal 10. In this case, the process is the same as in the first use case.

As described above, when the mobile terminal 10 of the employee 8 in the second use case is coupled to the company LAN, it is often determined that the request from the image forming apparatus 20 is received (step S120: YES).

When the image forming apparatus 20 can send the request to the mobile terminal 10 via the network N1 at step S120, the connection propriety determination unit 13 of the mobile terminal 10 determines to communicate with the mobile forming apparatus 20 via the network N1 using the first communication unit 161 in which the company AP communication information 1100 is set (step S180).

When the image forming apparatus 20 is determined not to receive the request (step S120: NO), the network switching unit 14 determines whether the storage unit 1000 stores other wireless communication parameter (step S130). The other wireless communication parameter is a wireless communication parameter which the communication propriety determination unit 13 does not determine whether a request is received. The other wireless communication parameter is, for example, a wireless communication parameter other than the company LAN communication information 1100 (in the first example, the second communication information 1300). That is, it is determined whether the second communication information 1300 is stored in the storage unit 1000.

When the storage unit 1000 is determined not to store the other wireless communication parameter (step S130: NO), the process proceeds to step S170. In this case, because any request is sent from the image forming apparatus and other wireless communication parameters are absent, the connection propriety determination unit 13 determines that communication with the image forming apparatus 20 is impossible (step S170). In this case, the non-connectable screen 931, illustrated in FIG. 10B, is displayed on the display device 102 of the mobile terminal 10.

When the storage unit 1000 is determined to store the other wireless communication parameter (step S130: YES), the image forming apparatus 20 performs the following processes (step S140):

(i) Switching of Network

The network switching unit 14 switches the connection to the network N2 using information on access point (SSID, password, and encryption scheme) included in the second communication information 1300.

(ii) Construction of Server Unit 12a

By switching the network, an IP address is reallocated to the mobile terminal 10 by the DHCP server. Then, the server construction unit 12 constructs the server again using the reallocated IP address. At this time, the one-time password is generated again. Moreover, the server construction unit 12 generates again the URL information 5000 from the reallocated IP address of the mobile terminal and the one-time password.

(iii) Transmission of the URL Information 5000

By the short-range communication unit 11 writing the URL of the server unit 12a constructed in (ii) (above-described URL information 5000) into the characteristic for reporting URL in the communication of BLE, the URL information 5000 is reported to the image forming apparatus 20.

Then, in the same way as at step S120, the connection propriety determination unit 13 determines whether the request for HTTP communication is acquired from the image forming apparatus 20 (step S150). Assuming that the third communication unit 261 of the image forming apparatus 20 is assumed to be connected to the network N1, and the fourth communication unit 262 of the image forming apparatus 20 is assumed to be connected to the network N2, use cases will be explained separately.

<<First Use Case>>

The mobile terminal 10 of the guest 9 is coupled to the network N2. Therefore, the fourth communication unit 262 of the image forming apparatus 20 communicates with the mobile terminal 10 with the URL generated by the URL information 5000 (sends a request for HTTP communication).

The third communication unit 261 of the image forming apparatus 20 may communicate with the server unit 12a of the mobile terminal 10 with the URL generated by the URL information 5000 in parallel with the fourth communication unit 262 or alternately. Even when the image forming apparatus 20 operates in this way, the first communication unit 161 or the second communication unit 162 of the mobile terminal 10 does not receive the request, because the mobile terminal 10 is not coupled to the network N1.

Moreover, because the network N2 is communication of P2P, presence of a device having the same IP address 3000 as the mobile terminal 10 need not be considered.

<<Second Use Case>>

When the mobile terminal 10 of the employee 8 is not coupled to the company LAN (network N1), the mobile terminal 10 of the employee 8 is also coupled to the network N2. Therefore, the fourth communication unit 262 of the image forming apparatus 20 communicates with the mobile terminal 10 using the URL generated by the URL information 5000 (sends a request for HTTP communication).

When the request for HTTP communication is not acquired from the image forming apparatus 20 (step S150: NO), the connection propriety determination unit 13 determines that communication with the image forming apparatus 20 is impossible (step S170). A case where a request cannot be received although the processes at step S140 are successful is a case where some fault occurring in the image forming apparatus 20, congestion of electric waves or the like can be considered as a reason.

When the request for HTTP communication is acquired from the image forming apparatus 20 (step S150: YES), the connection propriety determination unit 13 determines that the communication with the image forming apparatus 20 is possible via the network N2 (step S160).

At steps S160 and S170, the transmission completion screen 921, illustrated in FIG. 10A, is displayed on the display device 102 of the mobile terminal 10. That is, when a print job is sent via either of the network N1 and the network N2, the same screen is displayed. Then, the user need not be conscious of the difference of the networks. The mobile terminal 10 may indicate on the display device 102 via which network of the network N1 and the network N2 the print job is sent. Therefore, a user as the employee 8 can confirm whether the company LAN with high security can be used. Moreover, a user as the guest 9 can perceive that the print job of the user is sent via the P2P network.

<<Processes in Image Forming Apparatus>>

Subsequently, with reference to FIG. 14, the processes of the image forming apparatus 20 corresponding to the processes of the mobile terminal 10, illustrated in FIG. 13, will be described. FIG. 14 is a flowchart depicting an example for explaining a process of connecting the image forming apparatus 20 to the mobile terminal 10.

When the mobile terminal 10 switches the network, as described above in (ii), the URL information is also changed. Therefore, the image forming apparatus 20 checks repeatedly whether the URL information 5000 is received from the mobile terminal 10. When receiving the URL information 5000, the image forming apparatus 20 sends a request specifying the URL based on the received URL information 5000.

First, the short-range communication unit 25 of the image forming apparatus 20 determines whether the URL information is received from the mobile terminal 10 (step S1). When the URL information is not received from the mobile terminal 10 (step S1: NO), the process illustrated in FIG. 14 is performed again after a predetermined time elapses.

When the URL information is received from the mobile terminal 10 (step S1: YES), the short-range communication unit 25 reports to the communication unit 26. The communication unit 26 refers to the routing table, based on the IP address of the mobile terminal 10, causes the third communication unit 261 or the fourth communication unit 262 to send a request for HTTP communication to the mobile terminal 10 (step S2).

Next, because in the transmission of request the IP address of the image forming apparatus 20 is reported to the mobile terminal 10, the short-range communication unit 25 determines whether an end report of request is received from the mobile terminal 10 (step S3).

When the end report of request is not received (step S3: NO), the short-range communication unit 25 repeats the processes at steps S1 to S3 until receiving the end report of request.

Because the mobile terminal 10 performs the processes (i) to (iii) at steps S140 in FIG. 13 during the period from the reception of the first URL information by the image forming apparatus 20 to the reception of the second URL information, a predetermined period elapses from the reception of the first URL information to the reception of the second URL information. Therefore, at step S1, only when the URL information is not received after the predetermined period has elapsed, the URL information is determined not to be received from the mobile terminal 10.

According to the processes illustrated in FIG. 14, when the request is determined to be received from the image forming apparatus 20 (step S120: YES) in FIG. 13 (for the second use case), the URL information is determined to be received from the mobile terminal 10 (step S1: YES) in FIG. 14 and the end report of request is determined to be received (step S3: YES) in FIG. 14. The repetition in FIG. 14 does not occur.

In the other hand, when the request is determined not to be received (step S120: NO) and the request is determined to be received (step S150: YES) in FIG. 13 (for the first use case) (When the second communication information 1300 is received, the other wireless communication parameter is determined to be received (step S130: YES)), the URL information is determined to be received (step S1: YES) in FIG. 14 and the end report of request is determined not to be received (step S3: NO) in FIG. 14. Therefore, in the second process in FIG. 14, the URL information is determined to be received (step S1: YES) in FIG. 14 and the end report of request is determined to be received (step S3: YES) in FIG. 14.

As explained for the above-described processes, the print system 1 according to the first example, for the image forming apparatus 20 coupled to the plurality of networks, the user's labor of setting the company AP communication information 1100 or the second communication information 1300 can be reduced, and each user can select automatically a proper network.

<<Another Form of Wireless Communication Parameter>>

In the procedure illustrated in FIG. 13, when the communication is not possible by the company AP communication information 1100, possibility of communication is determined by the second communication information 1300. However, the user may desire to determine the possibility of communication by the second communication information 1300 in advance. For example, the administrator may consider that, even for the employee 8, when departments of the employees are different, the employees are desired to be connected to the P2P network N2.

Moreover, the image forming apparatus 20 may be considered to send a plurality of wireless communication parameters by BLE. Therefore, the order of determining possibility of communication based on each wireless communication parameter may be desired to be controllable, rather than being fixed.

In the following, an example will be described for determining which wireless communication parameter is selected for communication with the image forming apparatus 20 among the plurality of wireless communication parameters according to the predetermined priority order.

TABLE 3

| PRIORITY | ITEM NAME | | ITEM VALUE | |
| --- | --- | --- | --- | --- |
| 1 | NETWORK N1 | | | 1101 |
| | AVAILABLE/NOT USED | | | |
| 2 | NETWORK N2 | | | |
| | SSID | | 456DEF | |
| | PASSWORD | | ****** | |
| | ENCRYPTION SCHEME | | WPA/WPA2-PSK | |
| | HTTP PORT NUMBER | | 80 | 1300 |
| | HTTPS PORT NUMBER | | 443 | |
| | PORT NUMBER OF SERVER | | 50000 | |
| | FOR MOBILE TERMINAL | | | |
| | ... | | ... | |
| 3 | NETWORK N3 | | | |
| | SSID | | 789DEF | |
| | PASSWORD | | ****** | |
| | ENCRYPTION SCHEME | | WPA/WPA2-PSK | |
| | HTTP PORT NUMBER | | 80 | 1500 |
| | HTTPS PORT NUMBER | | 443 | |

TABLE 3-continued

| PRIORITY | ITEM NAME | ITEM VALUE |
|---|---|---|
| | PORT NUMBER OF SERVER FOR MOBILE TERMINAL | 50001 |
| | ... | ... |

TABLE 3 illustrates another example of the communication information 4000 transmitted by the image forming apparatus 20. In TABLE 3, in addition to the second communication information 1300 for the network N2, third communication information 1500 for a network N3 is set. Moreover, communication determination information 1101 is set for instructing whether the network N1 is used. In the communication determination information 1101, "available" means that the network N1 is used, and "not used" means that the network N1 is not used.

Moreover, priority of the network N1 is 1, priority of the network N2 is 2, and priority of the network N3 is 3. The smaller the value of the priority is, the higher the priority is. The priority can be set by the administrator of the image forming apparatus 20.

With the above-described communication information 4000, when the communication determination information 1101 for the network N1 of the priority 1 is "available", the connection propriety determination unit 13 determines whether the mobile terminal 10 can be connected to the network N1. When the communication determination information 1101 for the network N1 of the priority 1 is "not used", the connection propriety determination unit 13 determines whether the mobile terminal 10 can be connected to the network N2. When the mobile terminal 10 cannot be connected to the network N2, the connection propriety determination unit 13 determines whether the mobile terminal 10 can be connected to the network N3.

The communication information 4000 (second communication information 1300, third communication information 1500 and communication determination information 1101) is stored in the storage unit 1000.

With reference to FIG. 15, a process of determining of possibility of connection to a network will be described when the first communication information 1100, the second communication information 1300 and the third communication information have priorities. FIG. 15 is a flowchart depicting an example for explaining in detail the process of determining whether the mobile terminal 10 can be connected to the networks N1, N2 and N3 according to the priorities. In the following, mainly difference between FIG. 13 and FIG. 15 will be described.

First, the communication determination information 1101 is read out from the storage unit 1000, and the connection propriety determination unit 13 determines whether the network N1 is available (step S105).

When the network N1 is available (step S105: YES), in the same way as in FIG. 13, the processes at steps S110, S120 are performed. When the network N1 is not available (step S105: NO), the process proceeds to step S135.

When a request is determined to be received from the image forming apparatus 20 (step S120: YES), the connection propriety determination unit 13 determines whether a wireless communication parameter of the next priority is present (step S135). That is, the connection propriety determination unit 13 specifies priorities in descending order of the priorities given to the second communication information 1300 and the third communication information 1500 respectively, and determines whether communication information, connection possibility of which has not been determined, is present.

When the wireless communication parameter of the next priority is not present (step S135: NO), the connection propriety determination unit 13 determines that communication with the image forming apparatus 20 is impossible (step S170), and the process illustrated in FIG. 15 ends.

When the wireless communication parameter of the next priority is present (step S135: YES), the connection propriety determination unit 13 uses the second communication information 1300 or the third communication information 1500 of the next priority, and perform the same processes at step S140 in FIG. 13. Then, the connection propriety determination unit 13 determines whether a request can be received (step S150).

When the request is received from the image forming apparatus 20 (step S150: YES), the connection propriety determination unit 13 determines to communicate with the image forming apparatus 20 with the wireless communication parameter, with which connection to network is possible (a request can be acquired) (step S165).

When the request is not received from the image forming apparatus 20 (step S150: NO), the connection propriety determination unit 13 determines that communication with the network switched at step S140 is impossible. The process returns to step S135.

In this way, by registering priorities in the wireless communication parameters, a user can be connected to a proper network by using a wireless communication parameter to be used preferentially.

Because the priority of the network N1 that is the company LAN is the highest, the employees 8 can be connected to the company LAN preferentially. On the other hand, when the communication determination information 1101 indicates "not used", the employees 8 also can be connected to the P2P network. Moreover, because the communication information 4000 does not include the company AP communication information 1100 of the network N1, connection of the guest 9 to the company LAN remains difficult. Moreover, when the employee 8 or the guest 9 is connected to the P2P networks N2, N3, connection to the networks N2, N3 can be performed in the descending order of priority.

Moreover, the priority may be determined, for example, depending on communication band of each network.

SUMMARY

As described above, in the print system 1 according to the first example, the mobile terminal 10 acquires one or more wireless communication parameters from the image forming apparatus 20. Then, the mobile terminal 10 constructs the server unit 12a, sends the URL information 5000 to the image forming apparatus 20, and determines whether communication from the image forming apparatus 20 is present for the URL prepared based on the URL information 5000. When the communication is present, the mobile terminal 10 determines that communication with the image forming apparatus 20 is possible, and acquires an IP address of the image forming apparatus 20. On this process, an employee 8 is connected preferentially to a network N1 of a company LAN using the connection to the company LAN. A guest 9 is connected to a network N2 of a P2P network. That is, the mobile terminal 10 selects any one of a plurality of networks coupled to the image forming apparatus 20, and performs printing by sending a print job to the image forming apparatus 20 via the selected network. Therefore, even when the user cannot communicate with the image forming apparatus 20 via one network among the plurality of networks, the user need not set a wireless communication parameter for communicating with the image forming apparatus 20 via another network to the own mobile terminal 10. Therefore, labor of the user and the administrator of the print system 1 can be reduced.

Second Example

In the first example, it is explained that the image forming apparatus 20 may be an apparatus such as an image projection apparatus (projector). In the second example, a case where the image forming apparatus is an image projection apparatus (projector) will be described.

In the specification, because elements to which the same reference numeral is attached have the same function, an explanation of the element that has been explained may be omitted, or only difference may be explained.

FIG. 16 is a functional block diagram depicting an example of the print system 1 according to the second example. In FIG. 16, the configuration of the mobile terminal 10 is the same as in FIG. 5. On the other hand, in FIG. 16, the mobile terminal 10 communicates with an image projection apparatus 22, instead of the image forming apparatus 20. The image projection apparatus 22 includes an image projection unit 23.

The image projection apparatus 22 modulates image data using the DLP (Digital Light Processing) system or the liquid crystal system, and projects an image on a screen, a wall or the like. The image data are sent from the mobile terminal 10 via the network N1 or N2. The image projection unit 23 includes a projection engine of the DLP system or the liquid crystal system, and generates a projection image based on the image data.

FIG. 17 is a sequence diagram depicting an example for explaining a process of the print processing system according to the second example. The process illustrated in FIG. 17 is different from the process in FIG. 8 of the first example, at steps S89 to S8911. In the following, only the processes at steps S89 to S8911 will be explained.

The first communication unit 161 or the second communication unit 162 of the mobile terminal 10 requests the image projection apparatus 22 of a projection job via the network N1 or N2 (step S89). Therefore, the mobile terminal 10 can communicate with the image projection apparatus 22 via a communication protocol such as HTTP.

The third communication unit 261 or the fourth communication unit 262 of the image projection apparatus 22 receives the request for the projection job via the network N1 or N2, and reports the projection job to the image projection unit 23 (step S891).

The image projection unit 23 of the image projection apparatus 22 executes the projection job (step S8911). When the execution of the projection job is completed, the image projection unit 23 reports a completion report of the projection job to the third communication unit 261. The third communication unit 261 sends the completion report of the projection job to the mobile terminal 10.

According to the above-described procedure, the user can project the desired image by the image projection apparatus 22. In addition, in the case where the mobile terminal 10 causes the image forming apparatus 20 to print, when the mobile terminal 10 sends the print job to the image forming apparatus, the mobile terminal only has to wait for the completion of printing. On the other hand, in the case where the mobile terminal 10 causes the image projection apparatus 22 to project an image, the mobile terminal 10 need cause the image projection apparatus 22 to project the image for a plurality of times.

For example, when the mobile terminal updates a still image displayed on the display device 102 (including enlarging, reducing changing a display region, or the like in addition to switching of images) or the user reselects an image to be displayed, the mobile terminal 10 sends image data. When the mobile terminal 10 displays a motion image on the display device 102, the mobile terminal 10 periodically takes images to prepare image data, and sends the image data. The format of image data can be selected from JPEG, TIFF, GIF, PNG or the like, that the image projection apparatus 22 supports.

Moreover, the mobile terminal 10 may send directly a file including an image. For example, a PDF file or an MPEG file can be sent. In this case, the image projection apparatus 22 opens the file and converts it into an image to project.

As described above, the print system according to the second example has an effect of performing communication using a proper network that wirelessly communicates with the mobile terminal 10, and sending necessary data, such as image data, in addition to the effect of the first example.

Other Application Example

As described above, best mode for implementing the present invention has been described with reference to the examples. Further, the present invention is not limited to these embodiments, but various variations and modifications may be made without departing from the scope of the present invention.

For example, in the embodiment, the server unit 12a is constructed inside the mobile terminal 10. However, the server construction unit 12 may construct the server unit 12a on the Internet. In this case, the image forming apparatus 20 communicates with the server unit 12a on the Internet. Moreover, the mobile terminal 10 acquires an IP address of the image forming apparatus 20 from the server unit 12a.

Moreover, the information included in the second communication information 1300 is not limited to the one illustrated in TABLE 2. The information may include the IP address 3000, the hostname, a serial number, and a MAC address of the image forming apparatus 20.

Moreover, the configuration example, such as FIG. 5, is divided depending on the main functions in order to facilitate understanding of the processes of the mobile terminal 10 and the image forming apparatus 20. The present invention will not be restricted by the way of dividing into processing units or the names. The processes of the mobile terminal 10 and the image forming apparatus 20 can be further divided into a lot of processing units according to the process contents. Moreover, the division may be performed so that one processing unit includes more processes.

Moreover, the storage unit 1000 included in the mobile terminal 10 and the storage unit 2000 included in the image forming apparatus 20 may be retained by a device on the network, instead of being provided in the mobile terminal 10 or the image forming apparatus 20.

The short-range communication unit 11 is an example of communication means, the connection propriety determination unit 13 is an example of a determination means, the network switching unit 14 is an example of a connection means, the server construction unit is an example of a service provision unit preparation means, the UI display unit 15 is an example of a display means, and the job control unit 18 is an example of a request means.

The present application is based on and claims the benefit of priority of Japanese Priority Applications No. 2015-230917 filed on Nov. 26, 2015 and No. 2016-206940 filed on Oct. 21, 2016, the entire contents of which are hereby incorporated by reference.

INDUSTRIAL APPLICABILITY

The present invention can be applied to an information processing apparatus, an information processing system, and an information processing method.

REFERENCE SIGNS LIST

1 print system
10 mobile terminal
11,25 short-range communication unit
12 server construction unit
12a server unit
13 connection propriety determination unit
14 network switching unit
16,26,161,162,261,262 communication unit
20 image forming apparatus
27 print function unit

The invention claimed is:

1. A mobile terminal coupled to an output device via at least one of a plurality of networks, the mobile terminal comprising:
at least one processor; and
a memory storing computer readable instructions that cause the at least one processor to:
transmit communication information to the output device communicating with the mobile terminal via a short-range wireless communication method;
construct a server in the mobile terminal through which the output device communicates with, the mobile terminal using the communication information;
determine whether the constructed server has received a communication request, responsive to the transmission of the communication information, from the output device via a first network, the first network being based on a communication method that is different from the short-range wireless communication method; and
transmit an output request to the output device via the constructed server, wherein
the output request is transmitted to the output device via the first network in a case where the at least one processor determines that the communication request is received via the first network, and
the output request is transmitted to the output device via a second network in a case where the at least one processor determines that the communication request is not received via the first network, the second network being a network different from the first network, and being based on the communication method different from the short-range wireless communication method.

2. The mobile terminal according to claim 1, wherein the computer readable instructions further cause the at least one processor to:
receive a request from another mobile terminal via the constructed server, the constructed server being configured to provide a service; and
determine whether communication with the output device via the first network or the second network is established, based on whether communication between the output device and the constructed server is established.

3. The mobile terminal according to claim 2,
wherein when the output device communicates with the constructed server, the constructed server is configured to acquire address information that uniquely identifies the output device on the first network or the second network, and
wherein the computer readable instructions further cause the at least one processor to request the process from the output device that is uniquely identified by the acquired address information via the first network or the second network.

4. The mobile terminal according to claim 2,
wherein the constructed server is configured to return an indication that communication is successful in response to a first communication from the output device to the constructed server after the server is constructed, and return an indication that communication is not successful in response to a second or later communication from the output device to the constructed server.

5. The mobile terminal according to claim 2, wherein the computer readable instructions further causes the at least one processor to:
acquire a port number, and transmit the communication information including the port number to the output device; and
prepare the constructed server, a port of which the output device specifies by the port number.

6. The mobile terminal according to claim 5, wherein the computer readable instructions further cause the at least one processor to:
determine whether the port number has been already used in the mobile terminal, and
display on a display device, an indication that communication with the output device is impossible in a case where the port number has been used in the mobile terminal.

7. The information processing apparatus according to claim 5, wherein the computer readable instructions further cause the at least one processor to:
construct the server that authenticates the output device with a password transmitted from the output device; and
transmit the communication information including the password, wherein
in a case where the password transmitted by the at least one processor is determined to coincide with the password transmitted from the output device, it is determined that the mobile terminal can communicate with the output device via the first network or the second network, and
in a case where the password transmitted by the processor is determined not to coincide with the password transmitted from the output device, it is determined that communication between the mobile terminal and the output device has not been established via the first network or the second network.

8. The mobile terminal according to claim 1, wherein the computer readable instructions further cause the at least one processor to:
display an indication of requesting an operation of switching to the second network on a display device, before connecting to the second network, when the output device is not able to establish communication with the mobile terminal via the first network.

9. The mobile terminal according to claim 1, wherein the computer readable instructions further cause the at least one processor to:
cause the output device to end the communication with the mobile terminal using the communication information in a case where the processor determines that the output device is able to establish communication with the mobile terminal via the first network or the second network.

10. The mobile terminal according to claim 1, wherein the computer readable instructions further cause the at least one processor to:
acquire communication determination information, the communication determination information indicating whether the processor is to determine whether the output device communicates with the mobile terminal via the first network, wherein
the processor connects to the second network and transmits the communication information to the output device via the second network in a case where the communication determination information indicates that the processor is not to determine whether the output device communicates with the mobile terminal via the first network.

11. The mobile terminal according to claim 1, wherein the computer readable instructions further cause the at least one processor to:
when priority is attached to a plurality of pieces of communication information for the output device communicating with the mobile terminal, connect to different networks based on the respective pieces of communication information in a descending order of the priority, and
determine whether the mobile terminal can communicate with the output device via the first network or the second network according to whether the output device communicates with the mobile terminal using the communication information via the first network or the second network.

12. An information processing system including a mobile terminal that includes at least one processor, and one or more output devices, each coupled to the mobile terminal via at least one of a plurality of networks, the information processing system comprising:
a memory storing computer readable instructions that cause the at least one processor to:
transmit communication information to the output device communicating with the mobile terminal via a short-range wireless communication method;
construct a server in the mobile terminal through which the output device communicates with the mobile terminal using the communication information;
determine whether the constructed server has received a communication request, responsive to the transmission of the communication information, from the output device via a first network, the first network, being based on a communication method that is different from the short-range wireless communication method; and
transmit an output request to the output device via the constructed server, wherein
the output request is transmitted to the output device via the first network in a case where the at least one processor determines that the communication request is received via the first network, and
the output request is transmitted to the output device via a second network in a case where the at least one processor determines that the communication request is not received via the first network, the second network being a network different from the first network, and being based on the communication method different from the short-range wireless communication method.

13. An information processing method for an information processing system, the information processing system including a mobile terminal that includes at least one processor, and one or more output devices, each coupled to the mobile terminal via at least one of a plurality of networks, the information processing method comprising:
transmitting communication information to the output device communicating with the mobile terminal via a short-range wireless communication method;
constructing a server in the mobile terminal through which the output device communicates with the mobile terminal using the communication information;
determining whether a communication request, responsive to the transmission of the communication information, is received from the output device via a first network, the first network being based on a communication method that is different from the short-range wireless communication method; and
transmitting an output request to the output device, wherein
the output request is transmitted to the output device via the first network in a case where the at least one processor determines that the communication request is received via the first network, and
the output request is transmitted to the output device via a second network in a case where the at least one processor determines that the communication request is not received via the first network, the second network being a network different from the first network, and being based on the communication method different from the short-range wireless communication method.

* * * * *